United States Patent
Li et al.

(10) Patent No.: US 11,243,322 B2
(45) Date of Patent: Feb. 8, 2022

(54) AUTOMATED SYSTEM AND METHODS FOR ADAPTIVE ROBUST DENOISING OF LARGE-SCALE SEISMIC DATA SETS

(71) Applicant: Saudi Arabian Oil Company, Dhahran (SA)

(72) Inventors: Weichang Li, Houston, TX (US); Ke Chen, Alberta (CA)

(73) Assignee: Saudi Arabian Oil Company, Dhahran (SA)

( * ) Notice: Subject to any disclaimer, the term of this patent is extended or adjusted under 35 U.S.C. 154(b) by 213 days.

(21) Appl. No.: 15/914,802

(22) Filed: Mar. 7, 2018

(65) Prior Publication Data

US 2018/0259664 A1 Sep. 13, 2018

Related U.S. Application Data

(60) Provisional application No. 62/468,668, filed on Mar. 8, 2017.

(51) Int. Cl.
*G01V 1/36* (2006.01)
*G01V 1/32* (2006.01)

(52) U.S. Cl.
CPC .............. *G01V 1/368* (2013.01); *G01V 1/325* (2013.01); *G01V 1/364* (2013.01);
(Continued)

(58) Field of Classification Search
CPC ........ G01V 1/325; G01V 1/364; G01V 1/368; G01V 2210/3246; G01V 2210/3248; G01V 2210/324
(Continued)

(56) References Cited

U.S. PATENT DOCUMENTS 5,287,328 A * 2/1994 Anderson .............. G01V 1/364
367/38
7,616,524 B1 11/2009 Gersztenkorn
(Continued)

FOREIGN PATENT DOCUMENTS

CN 102707314 10/2012
CN 102749648 10/2012
(Continued)

OTHER PUBLICATIONS

Hankel matrix, Wikipedia, downloaded Oct. 4, 2020 from https://en.wikipedia.org/wiki/Hankel_matrix, 5 pp. (Year: 2020).*

(Continued)

*Primary Examiner* — Daniel L Murphy
(74) *Attorney, Agent, or Firm* — Fish & Richardson P.C.

(57) ABSTRACT

Seismic survey data is received, indexed into index sets, and each index set partitioned into data blocks. For each particular data block of a particular index set, the particular data block is sliced into frequency slices. For each particular frequency slice of the particular data block, the particular frequency slice is processed to remove random and erratic noise by: forming a Hankel matrix from the particular frequency slice: determining an optimal rank for the Hankel matrix, determining a clean signal and erratic noise from the ranked Hankel matrix, and returning the clean signal and erratic noise for the particular frequency slice. A clean signal is assembled from the index sets.

20 Claims, 24 Drawing Sheets

(52) U.S. Cl.
 CPC .......... *G01V 2210/324* (2013.01); *G01V 2210/3246* (2013.01); *G01V 2210/3248* (2013.01)

(58) Field of Classification Search
 USPC .......................................................... 367/38
 See application file for complete search history.

(56) References Cited

U.S. PATENT DOCUMENTS

| | | | |
|---|---|---|---|
| 10,345,468 | B2 | 7/2019 | Poole |
| 11,092,709 | B2 | 8/2021 | Zhao et al. |
| 2007/0064531 | A1 | 3/2007 | DuBose |
| 2011/0069581 | A1 | 3/2011 | Krohn |
| 2011/0213556 | A1 | 9/2011 | Yu et al. |
| 2013/0033961 | A1 | 2/2013 | Burnstad |
| 2013/0194893 | A1 | 8/2013 | Nagarajappa |
| 2013/0336091 | A1* | 12/2013 | Song ............. G01V 1/288 367/38 |
| 2014/0288838 | A1 | 9/2014 | Trickett |
| 2014/0365135 | A1 | 12/2014 | Poole |
| 2015/0316674 | A1 | 11/2015 | Deschizeaux et al. |
| 2016/0187513 | A1 | 6/2016 | Poole et al. |
| 2016/0320509 | A1 | 11/2016 | Almuhaidib |
| 2018/0136353 | A1 | 5/2018 | Zhao et al. |

FOREIGN PATENT DOCUMENTS

| | | |
|---|---|---|
| CN | 102854533 | 1/2013 |
| CN | 102998703 | 3/2013 |
| CN | 103645507 | 3/2014 |
| CN | 104483704 | 4/2015 |
| JP | 2007527157 | 9/2007 |
| WO | WO 2015078842 | 6/2015 |

OTHER PUBLICATIONS

Gulf Cooperation Council Examination Report issued in GCC Application No. GC 2018-34663 dated Dec. 2, 2019, 4 pages.
Alexandrov et al., "Improving land seismic repeatability with virtual source redatuming: synthesis case study," SEG Technical Program Expanded Abstracts 2012, Sep. 2012, pp. 1-5.
Gulf Cooperation Council Examination Report issued in GCC Application No. GC2018-34663 dated Jul. 28, 2019, 4 pages.
Gulf Cooperation Council Examination Report issued in GCC Application No. GC2017-34273 dated Jun. 7, 2019, 4 pages.
Ling et al., "A fast SVD for multilevel block Handkel matrices with minimal memory storage," Numerical Algorithms, Baltzer, Amsterdam, vol. 69, No. 4, Oct. 28, 2014, 17 pages.
International Search Report and Written Opinion issued in International Application No. PCT/US2018/021081 dated Jun. 8, 2018, 15 pages.
Gulf Cooperation Council Examination Report issued in GCC Application No. GC 2017-34273 dated Oct. 13. 2019, 4 pages.
Alexandrov et al., "Improving imaging and repeatability on land using virtual source redatuming with shallow buried receivers," XPo55463335, Geophysics vol. 8, No. 2, Mar. 1, 2015, 12 pages.
Askari and Siahkoohi, "Ground roll attenuation using the S and x-f-k transforms," Geophysical Prospecting vol. 56, Jan. 2008, 10 pages.
Bakulin and Calvert, "The virtual source method: Theory and case study," Geophysics 71(4), Jul.-Aug. 2006, 12 pages.
Bakulin and Calvert, "Virtual Source: new method for imaging and 4D below complex overburden," SEG International Exposition and 74th Annual Meeting, Society of Exploration Geophysicists, Oct. 10-15, 2004, 4 pages.
Cadzou, "Signal enhancement—A Composite Property Mapping Algorithm," IEEE Transactions on Acoustics, Speech and Signal Processing, vol. 36, No. 1, Jan. 1988, 14 pages.
Chen, "Robust matrix rank reduction methods for seismic data processing," Thesis for the degree of Master of Science in Geophysics, University of Alberta, Fall of 2013, 136 pages.
Diallo et al., "Characterization of polarization attributes of seismic waves using continuous wavelet transforms," Geophysics vol. 71, No. 3, May-Jun. 2006, 12 pages.
Halliday et al., "Interferometric ground-roll removal: Attenuation of scattered surface waves in single-sensor data," XP001553286, Geophysics, Society of Exploration Geophysicists vol. 75, No. 2, Mar. 1, 2010, 11 pages.
Li and Nozaki, "Application of Wavelet Cross-Correlation Analysis to a Plane Turbulent Jet," JSME International Journal Series B, vol. 40, No. 1, Feb. 15, 1997, 9 pages.
Liu and Fomel, "Seismic data analysis using local time-frequency decomposition," Geophysical Prospecting vol. 61, Issue 3, May 2013, 21 pages.
Mallat and Zhang, "Matching Pursuits With Time-Frequency Dictionaries," IEEE Transactions on Signal Processing vol. 41, No. 12, Dec. 1993, 19 pages.
Mehta et al., "Improving the virtual source method by wavefield separation," Geophysics vol. 72, No. 4, Jul.-Aug. 2007, 8 pages.
Mehta et al., "Strengthening the virtual-source method for time-lapse monitoring," Geophysics vol. 73, No. 3, May-Jun. 2008, 8 pages.
Pevzner et al., "Repeatability analysis of land time-lapse seismic data: CO2CRC Otway pilot project case study," Geophysical Prospecting 59, Jan. 2011, 12 pages.
Trickett et al., "Robust rank-reduction filtering for erratic noise," SEG, SEG Las Vergas 2012 Annual Meeting, Nov. 4-9, 2012, 5 pages.
Ulrych et al., "Tutorial: Signal and noise separation: Art and science," Geophysics vol. 64, No. 5, Sep.-Oct. 1999, 9 pages.
Van der Neut and Bakulin, "Estimating and correcting the amplitude radiation pattern of a virtual source," Geophysics 74(2), Mar.-Apr. 2009, 10 pages.
Van der Neut et al., "Controlled-source interferometric redatuming by crosscorrelation and multidimensional deconvolution in elastic media," Geophysics vol. 76, No. 4, Jul.-Aug. 2011, 14 pages.
Van der Neut, "Interferometric redatuming by multidimensional deconvulution," Thesis for the degree of Master of Applied Geophysics, Technische Universiteit Delft, Dec. 17, 2012, 295 pages.
Wapenaar and Fokkema, "Green's function representations for seismic interferometry," Geophysics vol. 71, No. 4, Jul.-Aug. 2006, 14 pages.
Yu et al., "Wavelet-Radon domain dealiasing and interpolation of seismic data," Geophysics vol. 72, No. 2, Mar.-Apr. 2007, 9 pages.
Zhao and Burnstad, "A new virtual source redatuming procedure to improve land 4D repeatability," 2015 SEG Annual Meeting, Society of Exploration Geophysicists, Oct. 18-23, 2015, 4 pages.
International Search Report and Written Opinion in International Application No. PCT/US2017/061452 dated Apr. 9, 2018, 16 pages.
International Search Report and Written Opinion issued in International Application No. PCT/US2018/015537 dated May 3, 2018, 16 pages.
Gulf Cooperation Council Examination Report issued in GCC Application No. GC 2018-34906 dated Sep. 27, 2019, 5 pages.
GCC Examination Report in GCC Appln. No. GC 2018-34906, dated Jan. 25, 2020, 4 pages.
CN Office Action in Chinese Appln. No. 201780083708.X, dated Oct. 26, 2020, 18 pages (English Translation).
GCC Examination Report issued in Gulf Cooperation Council Application No. GC 2018-34906 dated Jul. 17, 2020, 4 pages.
CN Office Action in Chinese Appln. No. 201880022609.5, dated Feb. 24, 2021, 11 pages, with English Translation.
CN Office Action in Chinese Appln. No. 201880030309.1, dated Apr. 30, 2021, 12 pages, with English Translation.
JP Office Action in Japanese Appln. No. 2019-548914, dated Nov. 24, 2021, with English Translation, 10 pages.

* cited by examiner $$D(\omega) = H[d(\omega)] = \begin{pmatrix} d_1(\omega) & d_2(\omega) & \cdots & d_{N-L+1}(\omega) \\ d_2(\omega) & d_3(\omega) & \cdots & d_{N-L+2}(\omega) \\ \vdots & \vdots & \ddots & \vdots \\ d_L(\omega) & d_{L+1}(\omega) & \cdots & d_N(\omega) \end{pmatrix}$$

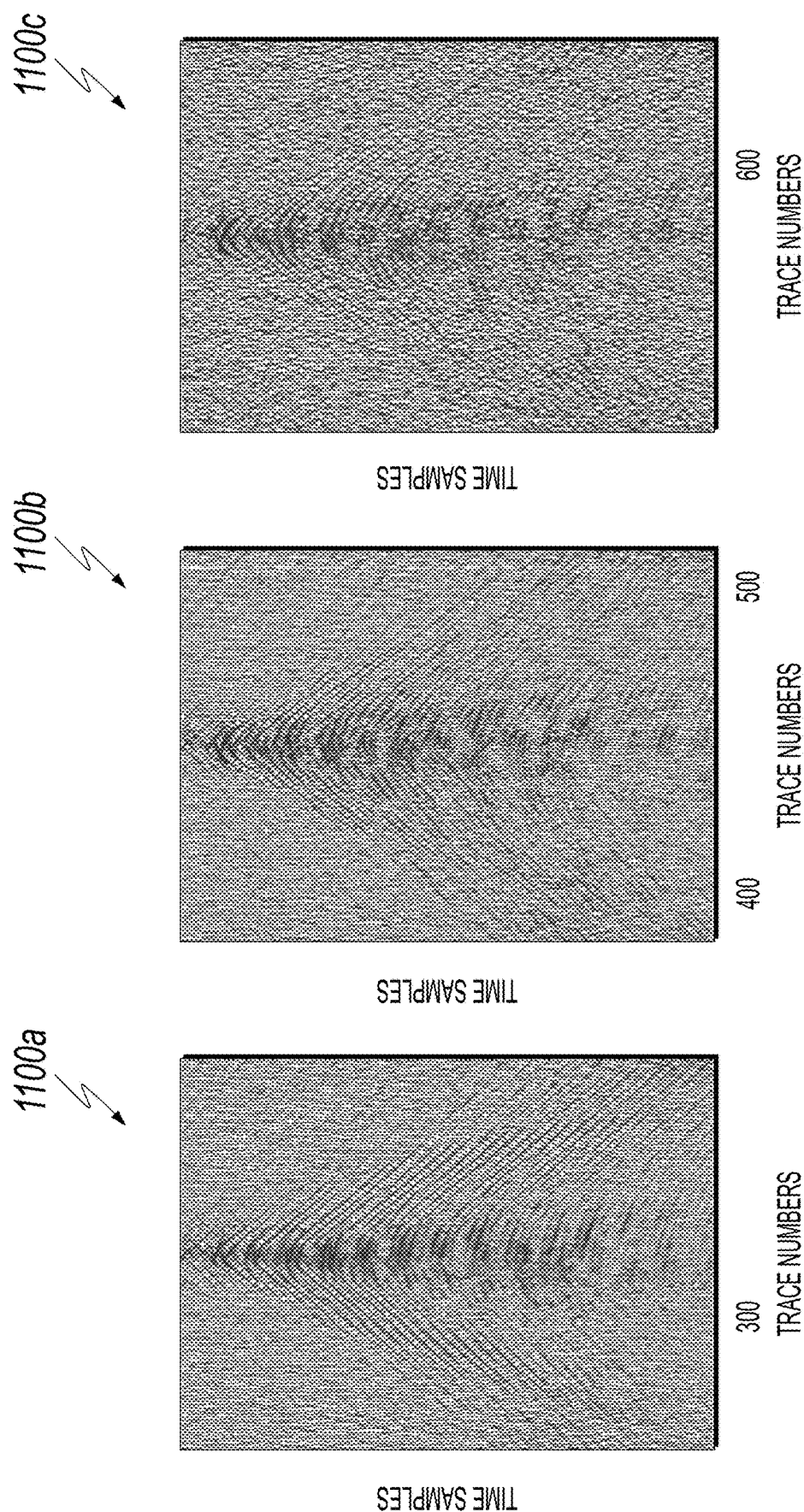

AUTOMATED SYSTEM AND METHODS FOR ADAPTIVE ROBUST DENOISING OF LARGE-SCALE SEISMIC DATA SETS

CROSS-REFERENCE TO RELATED APPLICATIONS

This application claims the benefit of priority to U.S. Provisional Application, Ser. No. 62/468,668, entitled "AUTOMATED SYSTEM AND METHODS FOR ADAPTIVE ROBUST DENOISING OF LARGE-SCALE SEISMIC DATA SETS", filed on Mar. 8, 2017, the entire contents of which is hereby incorporated by reference.

BACKGROUND

Seismic data is typically contaminated with unwanted energy (or noise). Depending on a particular application using the seismic data, different types of energy can be considered as noise. Random Gaussian noise often implies very limited or no spatial and temporal correlation, and typically with low or moderate amplitude. Source-generated coherent noise includes ground roll, side-scattered noise, guided waves, air waves, multiples, and reverberations, which is correlated in both space and time. Unwanted energy in seismic data that is neither source-generated nor well-modeled as random Gaussian noise is often referred to as erratic noise. Typical erratic noise has high amplitudes and can include noise spikes, bursts, traffic noise, power-line noise, swell noise, seismic interference noise, and even polarity reversals. Erratic noise in seismic data can severely degrade the performance of subsequent processing, especially related to subsurface structure imaging and elastic property inversion. This is primarily due to a large overlap in the frequency-wavenumber (f-k) domain between erratic noise and signal components. In addition, erratic noise tends to have a high amplitude that can overwhelm or severely distort signals in the overlapping f-k region. Conventional denoising methods are typically inadequate for erratic noise removal.

SUMMARY

The present disclosure describes removing noise from massively-sized seismic data sets obtained from large-scale field surveys.

In an implementation, seismic survey data is received, indexed into index sets, and each index set partitioned into data blocks. For each particular data block of a particular index set, the particular data block is sliced into frequency slices. For each particular frequency slice of the particular data block, the particular frequency slice is processed to remove random and erratic noise by: forming a Hankel matrix from the particular frequency slice: determining an optimal rank for the Hankel matrix, determining a clean signal and erratic noise from the ranked Hankel matrix, and returning the clean signal and erratic noise for the particular frequency slice. A clean signal is assembled from the index sets.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations so as to realize one or more of the following advantages. First, the described automated process for denoising large-scale data sets is adaptable to local signal and noise characteristics. The use of the automated denoising process permits consistent denoising performance, with minimal manual intervention. Second, denoising performance is improved in terms of effective suppression of both erratic and random noises with reduced signal distortions. The improvement in denoising performance is due to optimally-adapted algorithm parameters and model assumptions tuned to local signal and noise characteristics. Third, improved computational efficiency is achieved by using vector optimization instead of a matrix form involving large, multi-level matrices. Fourth, data storage requirements are reduced due to the use of vector optimization.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

FIG. 8 illustrates a Hankel matrix of a data sequence at a given frequency band, according to an implementation of the present disclosure.

FIGS. 11A-11F illustrate that adaptive singular spectrum analysis (SSA) with frequency dependent rank reduction produces significantly smaller signal distortion for complex events, according to an implementation of the present disclosure.

Like reference numbers and designations in the various drawings indicate like elements.

DETAILED DESCRIPTION

Figure 1:
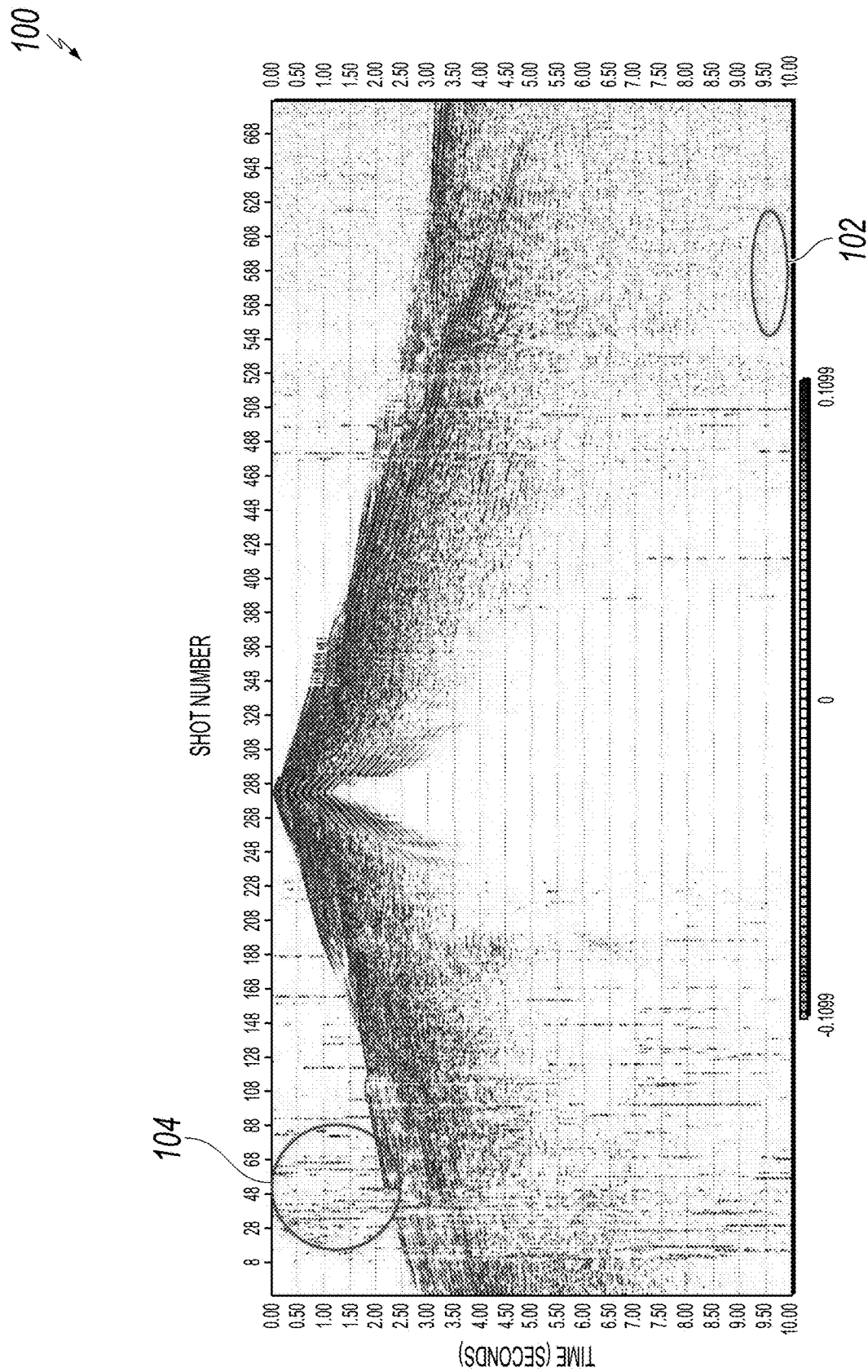
FIG. 1 is a screenshot of a rendering of a common, noisy receiver gather from a field survey dataset, according to an implementation of the present disclosure.

The following detailed description relates generally to the field of geophysical prospecting and data processing. Specifically described is a method to identify subsurface hydrocarbon resources through an automated process, with minimal to no manual intervention, for removing noise from massively-sized seismic data sets obtained from large-scale field surveys. The described subject matter is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Seismic data is typically contaminated with unwanted energy (or noise), and can be expressed as in Equation (1):

$$D=S+N \qquad (1),$$

where D is data of an x dimension, S is signal, and N is noise. Depending on a particular application using the seismic data, different types of energy can be considered as noise and affect the particular application in different ways. For example, random Gaussian noise often implies very limited or no spatial and temporal correlation, and typically with low or moderate amplitude. However, source-generated coherent noise includes, for example, ground roll, side-scattered noise, guided waves, air waves, multiples, and reverberations, which is correlated in both space and time. Unwanted energy in seismic data that is neither well-modeled as random Gaussian noise nor source-generated is often referred to as erratic noise. Typical erratic noise can include, for example, noise spikes, bursts, traffic noise, power-line noise, swell noise, seismic interference noise, and polarity reversals. Erratic noise in seismic data can severely degrade the performance of processing efforts, especially related to subsurface structure imaging and elastic property inversion. This is primarily due to a large overlap in the frequency-wavenumber (f-k) domain between erratic noise and signal components. In addition, erratic noise tends to have a high amplitude that can overwhelm or severely distort signals in the overlapping f-k region. Conventional denoising methods are typically inadequate for erratic noise removal, calling for robust denoising techniques. The performance of both conventional and robust denoising algorithms depend on and can be very sensitive to: 1) model assumptions for signal and noise characteristics in the data and 2) chosen algorithmic parameters based on the model assumptions. One of the major challenges in applying denoising algorithms to large-scale field data sets is caused by typically significant variations of signal and noise characteristics across spatial, temporal, and frequency domains. Successful processing of these types of large data with consistent performance requires algorithmic parameters or model structures to be adaptively adjusted in an automated fashion.

For example, FIG. 1 is a screenshot of a rendering 100 of a common, noisy receiver gather from a field survey dataset, according to an implementation of the present disclosure. In addition to random noise 102, there are strong erratic noises 104 associated with rapid fluctuations in shot locations, with artifacts from pre-processing and power line noises. In FIG. 1, example random noise 102 is indicated by the circled dotted incoherent patterns and example erratic noise 104 by the circled vertical strips.

Figure 2A:
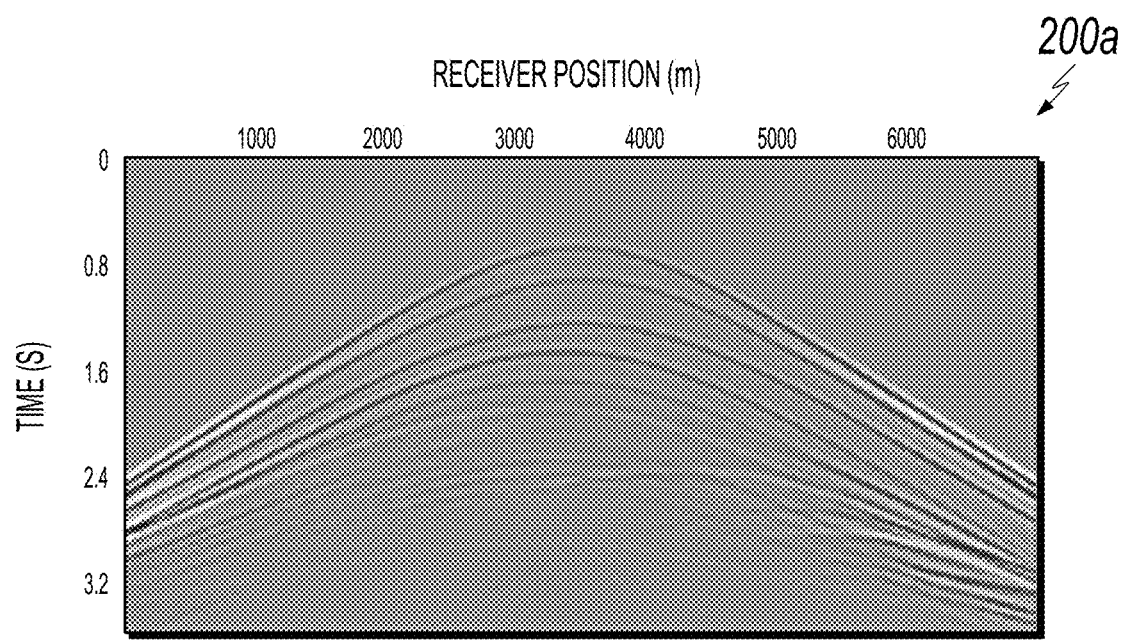
FIGS. 2A-2D are renderings of the effect of erratic noise on image processing, according to an implementation of the present disclosure.
Figure 2B:
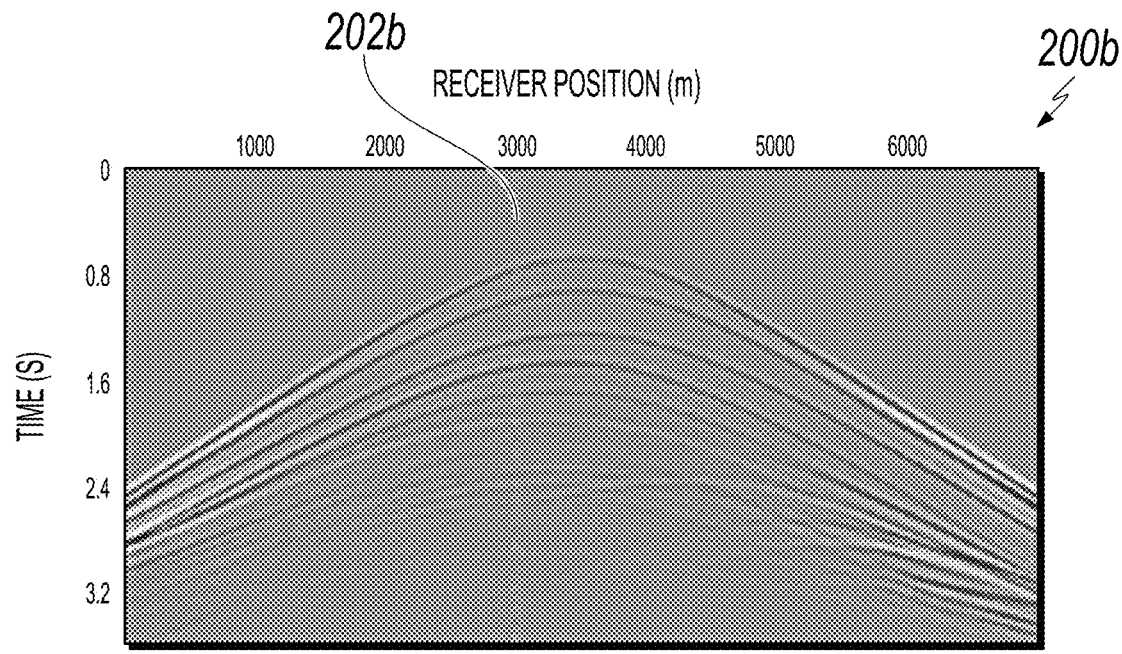
Figure 2C:
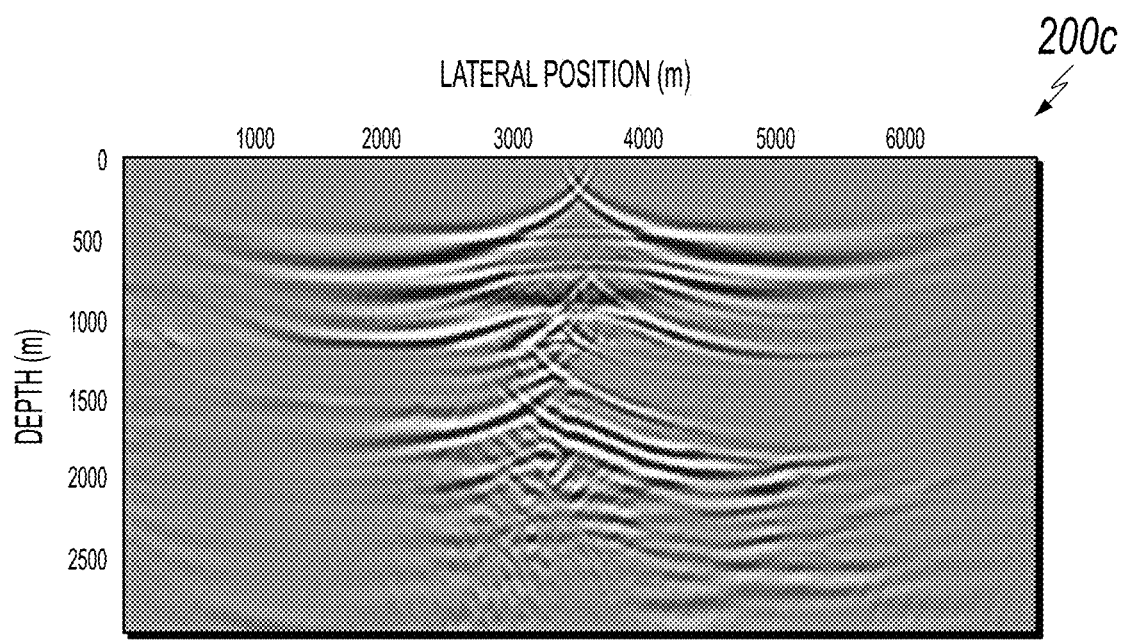
Figure 2D:
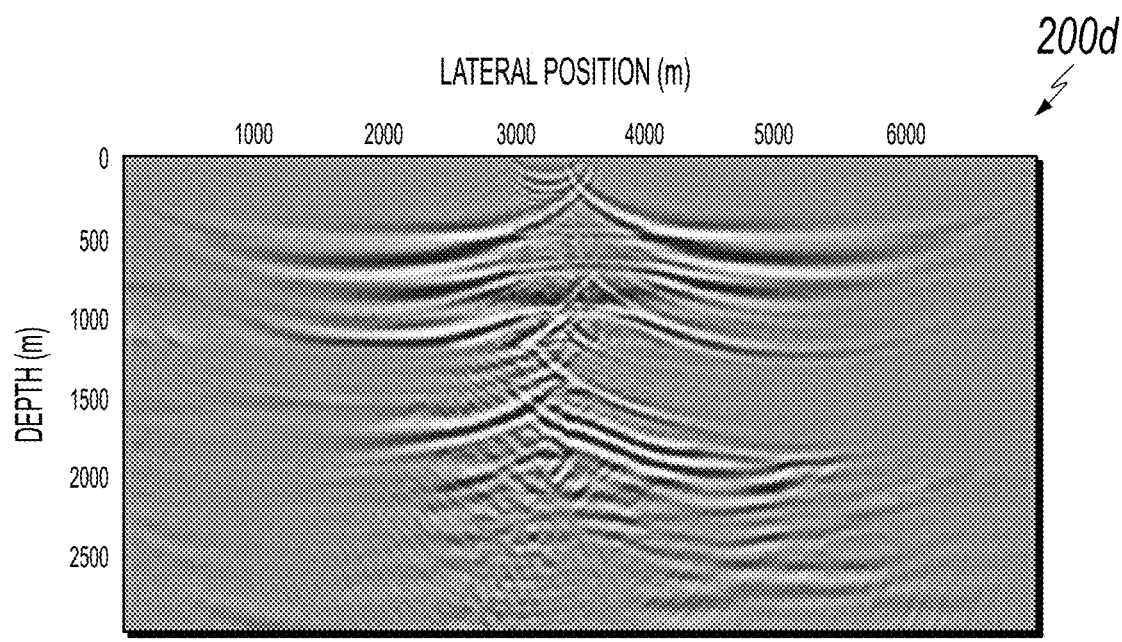

Turning to FIGS. 2A-2D, FIGS. 2A-2D are renderings 200*a*-200*d*, respectively, of the effect of erratic noise on image processing, according to an implementation of the present disclosure. For example, FIG. 2A illustrates a clean shot gather, FIG. 2B illustrates a noisy shot gather with a strong erratic noise component 202*b*, FIG. 2C illustrates a one-way, wave-equation-based imaging of the clean shot gather of FIG. 2A, and FIG. 2D illustrates a one-way, wave-equation-based imaging of the noisy shot gather. FIGS. 2A-2D demonstrate that the presence of an erratic noise line in a shot gather (for example, 202*b* in FIG. 2B) can cause severe degradation in a resulting image. Here, the artifacts in the image are related to the Green's function with a source at the erratic noise receiver location. Seismic noise suppression before stack improves the result of, for example, demultiplication, velocity analysis, pre-stack migration and imaging. Noise suppression after stack or migration benefits, for example, seismic interpretation.

Existing denoising methods require a significant level of human intervention, for signal and noise model order selection, erratic noise detection, identification, and removal. Recent research in robust denoising decomposes (transforms) data into signals, random, and erratic noises. Signals are recovered from low-rank components of the transformed data; erratic noises are removed as the sparse components from the residual.

Many existing denoising methods transform data into a particular domain where signal and noise can be better separated, as expressed in Equation (2):

$$\mathcal{T}_D = \mathcal{T}_S + \mathcal{T}_N \qquad (2).$$

From Equation (2), the signal component is filtered and inverse transformed, as expressed in Equation (3):

$$S = \mathcal{T}^*[\mathcal{F}(\mathcal{T}_D)] \qquad (3),$$

where $\mathcal{T}$, $\mathcal{T}^*$, and $\mathcal{F}$ denote the transform, the transform adjoint, and the filter operators, respectively.

A number of methods for random noise attenuation have been developed. For example, frequency band-pass filtering can be used for suppressing ambient noise outside of a seismic signal spectral band, but is limited by signal and noise overlap in the frequency domain. Spatial prediction filtering can be implemented in the frequency domain (f-x) or time domain (t-x), based on the working principle assuming lateral predictability of the signals. The f-x prediction filtering method implicitly represents the f-x seismic data by an autoregressive (AR) model, where a linearly predictable part is considered the signal and an unpredictable portion is considered white noise. The prediction error filter (PEF) is then estimated from the data before it is used to estimate the signal. The f-x projection filtering technique models linear events in f-x using an autoregressive and moving-average (ARMA) model and estimates noise using application of a deconvolved PEF on the data to better preserve signal. The t-x prediction filtering techniques are more suitable when signal or noise is non-stationary in a temporal or a spatial direction. It can be implemented, for instance, using a two-dimensional (2D) adaptive least-mean-squared (LMS) filter.

Another class of denoising method is based on matrix rank reduction. Matrix rank reduction assumes that a matrix formed in some particular way from a noise-free seismic signal is of low rank, and random noise in seismic data will increase the rank of the matrix formed from noisy data in the same way, by adding small singular values in a signal null space. Rank reduction on the matrix using truncated singular value decomposition (TSVD) can remove or suppress random noises from the data. Early matrix rank reduction methods in t-x domain include the Karhunen-Loeve (K-L) transform, and singular value decomposition (SVD) (sometimes referred to as the eigenimage reconstruction method), both requires linear move-out correction of dipping events as the prerequisite step. Spectral matrix filtering techniques include K-L transform in f-x, an f-xy eigenimage applied to stacked data, Cadzow filtering, and singular spectrum analysis (SSA) in the f-x.

The spatial prediction filtering and matrix rank reduction methods, while generally effective for random noise attenuation, do not perform well, as: 1) signal events are highly nonlinear or 2) seismic data is corrupted with erratic (non-Gaussian) noise. The latter is due to the least squares minimization involved in these methods and can be seriously degraded in the presence of erratic noises.

Conventional erratic noise attenuation methods include, for example, trace editing, CMP stacking, and band-pass filtering. However, erratic noise attenuation methods typically require manual intervention. Trace editing relies on human interpretation and intervention to remove noisy traces with high-amplitude, which is not practical for realistic, massively-scaled seismic surveys. CMP stacking, effectively using the mean estimate of CMP to gather traces, is sensitive to outliers. Band-pass filtering tends to remove signal along with noise when overlapping in a frequency domain. To alleviate these issues, automatic and robust measures, such as outlier detection and rejection (for example, based on measures such as magnitude, relative amplitude decay rates, and slope) have been attempted. Erratic noise is detected first and followed by damping or interpolation. Other methods include robust CMP and harmonic noise cancellation using Wiener filtering. However, the performance of these procedures can be very sensitive to signal and noise structure in the data and is generally not as good as robust estimation procedures.

Robust denoising procedures include, for example, direct robust inversion, robust f-x projection, and robust SSA denoising. Direct robust inversion replaces truncated SVD in SSA by a robust low rank approximation, effectively replacing a Frobenius metric by a robust metric for error matrix between the data and the estimated signal, and solving using matrix factorization and robust M-estimation for the associated underlying signal. Robust f-x projection modifies an ARMA model in f-x projection to account for erratic noise, resulting in a robust f-x projection filter that can remove random Gaussian noise and erratic noise. Robust SSA denoising using simultaneous low-rank and sparse estimation decomposes data into signals, random, and erratic noises. Signals are recovered from low-rank components of a Hankel matrix of each frequency slice of the data and erratic noises are removed as the sparse components from the residual. The idea is based on a matrix pencil notion that in the presence of k number of independent plane waves propagating in different directions, the Hankel matrix properly constructed from the clean data is of rank k. The performance of these methods can be very sensitive to the chosen algorithm parameters including model order or matrix rank, or threshold level for singular values and erratic noises. These parameters are often manually chosen using heuristic schemes which limits their practical usage in processing large-scale data sets in field-survey seismic applications.

Most of this research, however, has been focused on relatively small data sets and considering performance using data windows of limited size. Among other limitations, two major issues in these denoising algorithms prevent them from being feasibly applied to a large-scale survey data set with consistent results. First, there is a performance tradeoff between noise suppression and signal distortion, as controlled by algorithmic parameters and influenced by the input signal and noise structure. Existing algorithms adopt ad hoc schemes to choose parameters to suit the data within the fixed region under consideration. Second, out of complexity concerns, these algorithms are generally applied on a patch-by-patch (2D) or cube-by-cube three-dimensional (3D) basis. Manually adjusting parameters is not only infeasible, but prone to artifacts and inconsistent results across regions. Further, within a large survey data set, signal and noise structure can change drastically from patch-to-patch or cube-by-cube (note that a "patch" can also be referred to a "window" and a "cube" as a "block"). This is due to the dynamics of wave propagation and reflection and the complexity of subsurface structures, signal and noise characteristics. The dynamics can change substantially from patch-to-patch or cube-by-cube, as well as across frequency bands. As a result, the performance of denoising algorithms vary significantly across a spatial domain, resulting in a so-called mosaic effect. Accordingly, a fully automated denoising process of large-scale survey data sets requires adaptive methods.

Figure 3:
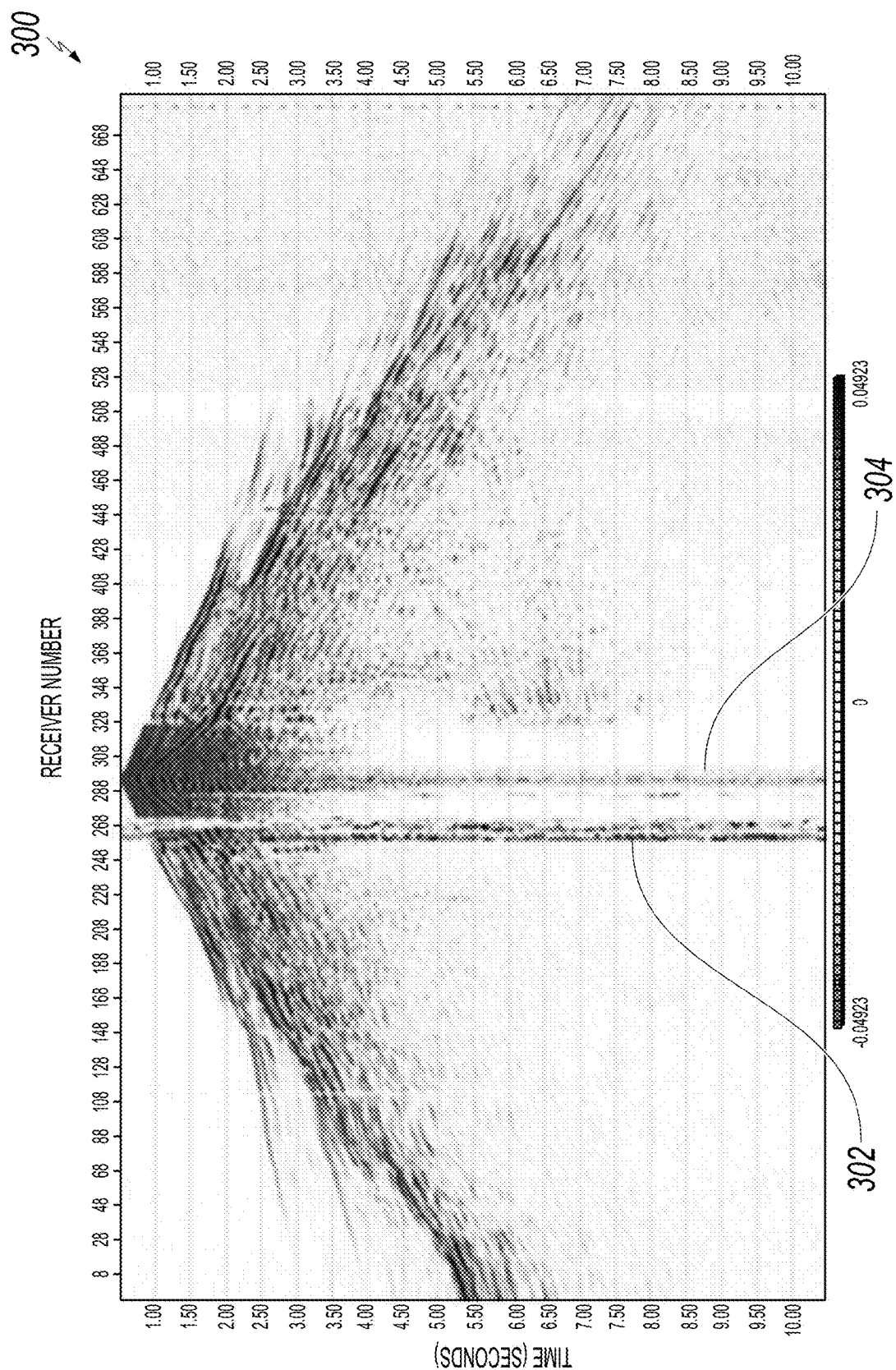
FIG. 3 is a rendering of a common shot gather contaminated by erratic noise, according to an implementation of the present disclosure.

FIG. 3 is a rendering of a common shot gather 300 contaminated by erratic noise, according to an implementation of the present disclosure. For example, 302 and 304 identify erratic noise contamination in the common shot gather 300.

Figure 4A:
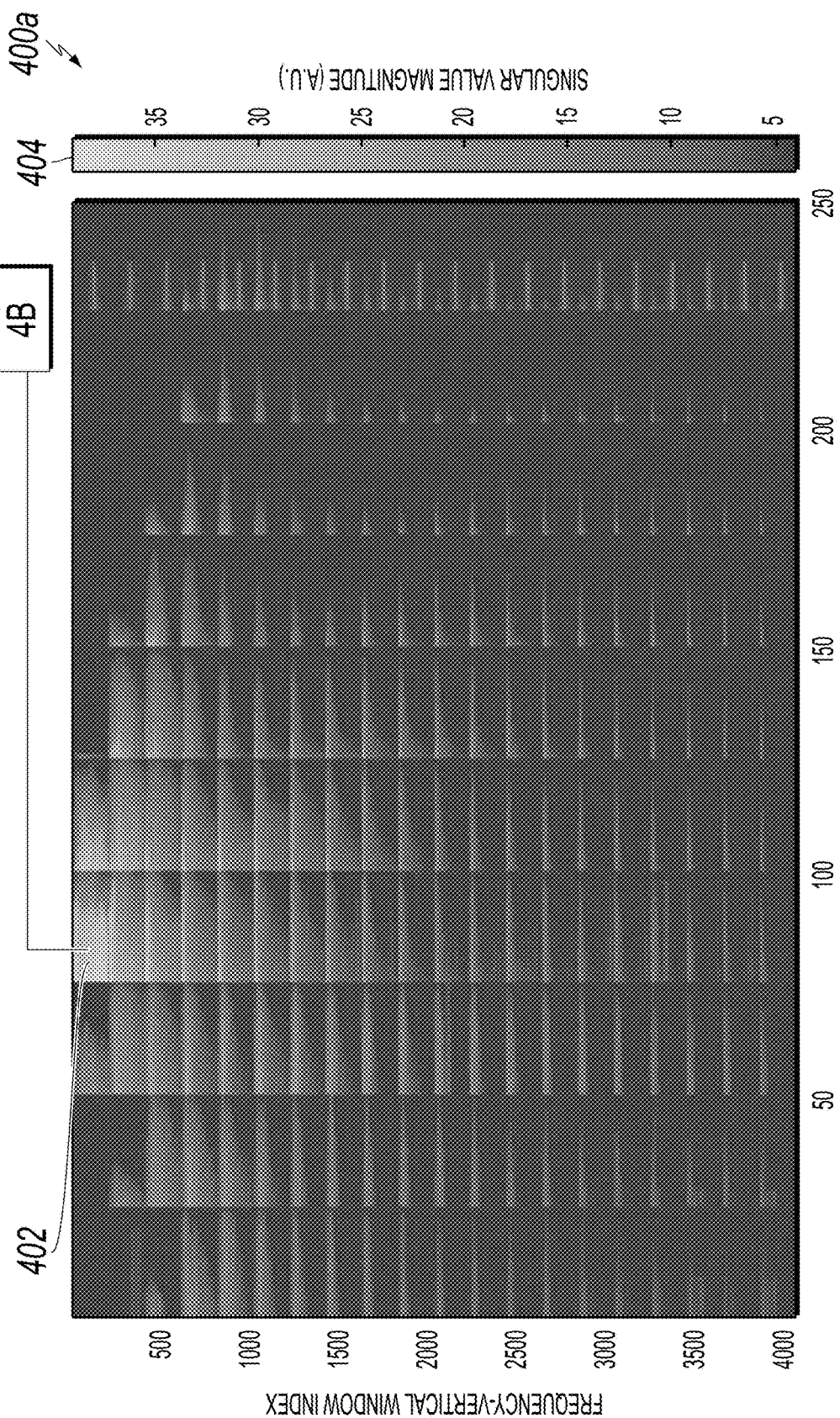
FIG. 4A is a rendering of the singular value decomposition (SVD) within each non-overlapping, spatial-temporal processing patch of the seismic shot gather of FIG. 3, according to an implementation of the present disclosure.

FIG. 4A is a rendering of the SVD 400a within each non-overlapping, spatial-temporal processing patch of the seismic shot gather of FIG. 3, according to an implementation of the present disclosure. Here, the rendering 400a consists of 20 (vertical)×10 (horizontal) non-overlapping windows (or spatial-temporal, processing patches) 402 (similar to partitioning of the original seismic trace data). Each window, of dimension 203 (vertical)×25 (horizontal), corresponds to the singular value vs frequency spectra (for example, FIG. 4B) computed from the seismic traces within each window's data. The total dimension of the rendering 400a is 4060 (vertical)×250 (horizontal). The unit of the vertical axis is frequency-vertical window index, and the horizontal unit is the singular value-horizontal window index. The 20×10 grid of windows 402 illustrates clearly (by change in color pattern) spatial-temporal and frequency dependence of the singular value spectra. Color bar 404 corresponds to singular value magnitude expressed in arbitrary unit (A.U.) since a number of preprocessing steps are typically applied to raw data which can alter a true physical unit.

Figure 4B:
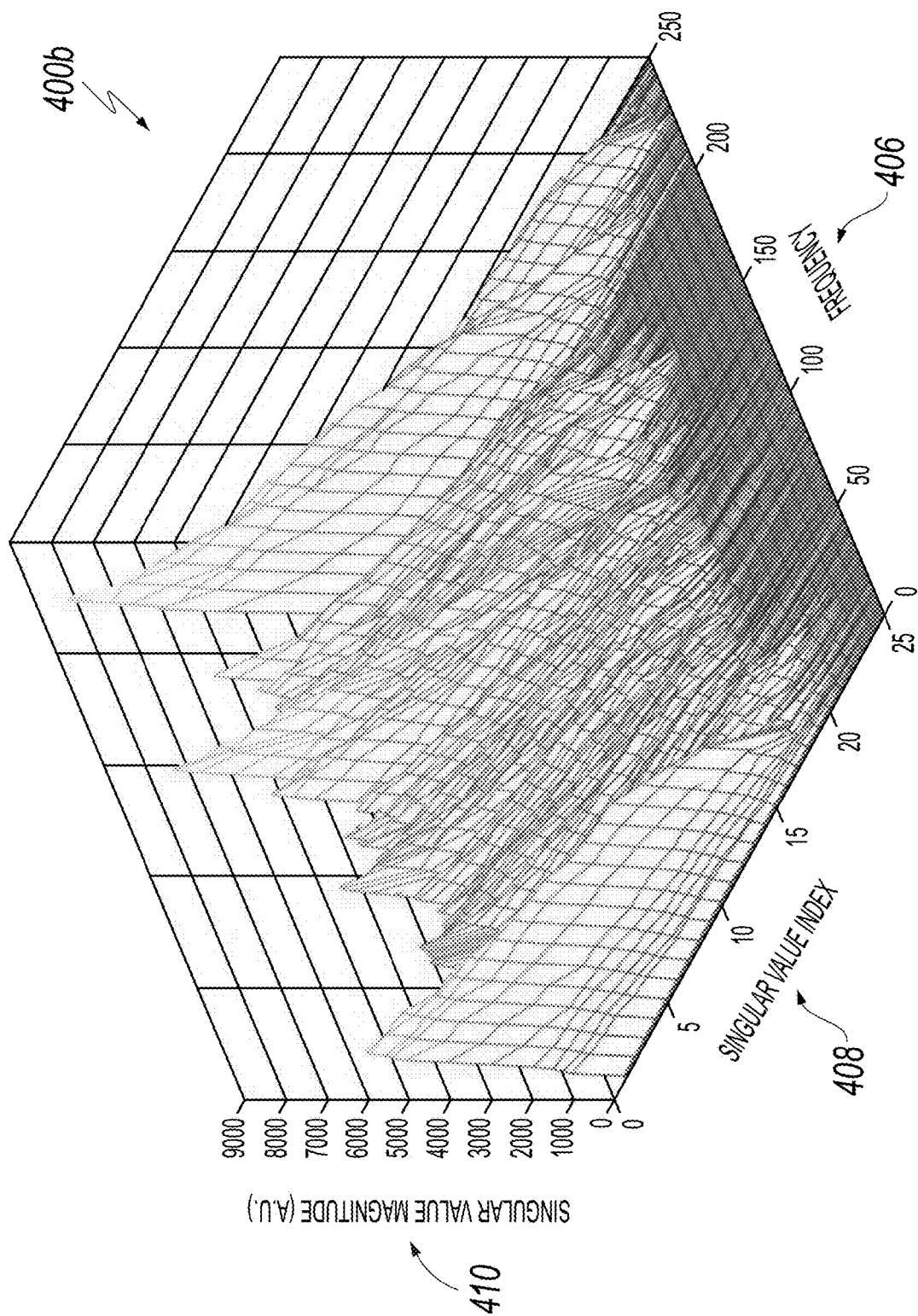
FIG. 4B illustrates a plot of a single processing patch of FIG. 4A, according to an implementation of the present disclosure.

Turning to FIG. 4B, FIG. 4B illustrates a plot 400b of a single window 402 of FIG. 4A, according to an implementation of the present disclosure. FIG. 4B is obtained, for data in one window 402 shown in FIG. 4A, by calculating the singular values of the Hankel matrix at each frequency for 250 frequencies (the 'Y' horizontal axis). The 'X' horizontal axis represents 25 singular values and the 'Z' axis 410 represents singular value magnitude in A.U. A Hankel matrix of size 25×25 is configured for each slice of a frequency 406. The 25 singular value indices 408 of each Hankel matrix are plotted in each window 402 for the frequency slices (here, while the processing window size is a parameter chosen by the denoising algorithm, two-hundred and fifty frequency slices 406 were chosen to illustrate variations across spatial-temporal and frequency domains).

The disclosure describes an automated denoising processing of massively-scaled seismic data sets based on adaptive methods without the need for (or only minimal) human intervention, while achieving improved performance that is consistent across the entire data set. At a high-level, the described methods choose the parameters adaptively across frequency bands and over local structures of signals and noise (time-spatial regions) embedded in the data using frequency-dependent local rank revealing and optimal thresholding. More specifically, the adaptive methods estimate the ambient noise level at each frequency, adaptively determine the signal structure (rank) and extract the signal components directly from the noisy data. The methods use efficient vector optimization with a low memory requirement. The described processing results in significant noise suppression and higher fidelity signal preservation, than existing methods using fixed or suboptimal parameters and will permit, for example, generation of a clearer structural image of a subsurface. This clearer structural image can, for example, be provided as an input for decision making regarding drilling and production of hydrocarbons. Other uses of the data, consistent with this disclosure, are also considered to be within the scope of the disclosure.

Figure 5:
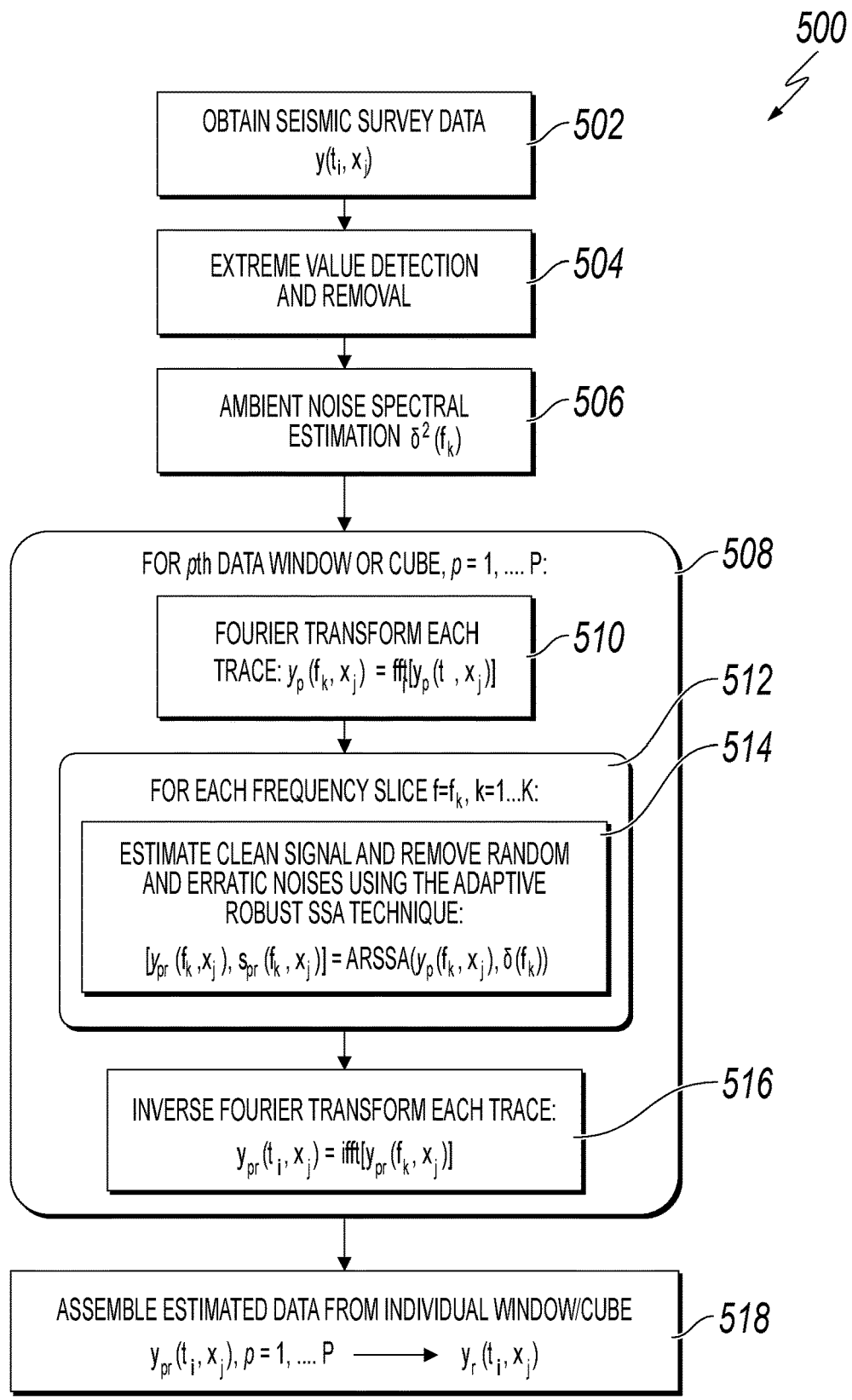
FIG. 5 is a flowchart of an example method for an automated process of denoising a large-scale seismic data set, according to an implementation of the present disclosure.

FIG. 5 is a flowchart of an example method 500 for an automated process of denoising a large-scale seismic data set, according to an implementation of the present disclosure. For clarity of presentation, the description that follows generally describes method 500 in the context of the other figures in this description. However, it will be understood that method 500 may be performed, for example, by any suitable system, environment, software, and hardware, or a combination of systems, environments, software, and hardware as appropriate. In some implementations, various steps of method 500 can be run in parallel, in combination, in loops, or in any order.

A typical seismic field survey, either on land or offshore, involves thousands of shots ($N_s$~1000×) and thousands of receivers ($N_r$~1000×), where $N_s$ represents a number of shots and $N_r$ represents a number of receivers. Received seismic traces can be grouped in many different ways: 1) indexed by the responsible shot, 2) a common receiver in response to all the shots, or 3) other sorting schemes such as offset and reflection angle.

Based on one of these sorting schemes, for example, a common receiver gather (as shown in FIG. 1) or a common shot gather (as shown in FIG. 3), processing can then be carried out on one index set after another until an entire data set is completed (applicable to both 2D and 3D acquisitions, and to both pre-stack and post-stack data). For clarification, a seismic data set is often generated using a large number of receivers and transmitters. A transmitter produces a seismic excitation, often called a "shot" whose reflection from subsurface features (for example, rock layers) are received by all the receivers. The received data set can be sorted according to shot or receivers, or other combinations based on the relative geometry between pairs of shot/receivers. Here, index set is used to describe this type of index basis (for example, ordered shot sets), so that the data can be sorted and processed in corresponding order.

At 502, a seismic survey data set (data set), denoted as $y(t_i, x_j)$, is obtained for processing, where $t_i$ denotes an $i^{th}$ time (t) sample point and $x_j$ denotes the $j^{th}$ spatial coordinate (x). The size of the data set is typically too large to be processed in a single data matrix, due to a high value of $N_r$ and a recorded time length ($N_t$). The data set is partitioned into multiple, spatial-temporal blocks with or without overlapping, with each block of size M×N (note that for 3D, N can be $N_x$×$N_y$) and then applying denoising block-by-block. For clarification, M×N is the window size. In a common shot gather, for example, M is the time duration in the window and N is the spatial dimension of the window, (for example, the number of receiver traces). Therefore for 3D, the window spatial dimension will cover receivers within a span of $N_x$×$N_y$, all of which are stacked into N=$N_x$×$N_y$ traces. Sorting/partitioning can take place prior to or after the extreme value detection and spectral estimation.

The data set is then subjected to one or more additional preprocessing steps including: 1) detection and removal of outlier data points with extremely large magnitudes that are clearly outside of the normal range of data values (at 504) and 2) estimation of the ambient noise spectra, denoted as $\sigma^2(f_k)$ (at 506).

Detection and removal of outlier data points (at 504) is not intended to remove common erratic noise, but instead aims to remove outlier data points that are reliably identified according to their high magnitude values (for example, using a histogram approximation to distribution density), so that the data points will not affect the performance of the subsequent robust adaptive denoising. If the high magnitude values are left un-addressed, the data points can overwhelm signal structure and cause large residual noises in output.

Estimation of ambient noise spectra (at 506) is carried out by applying regular spectral estimation techniques to the data recorded before direct waves arrive, and are either averaged over multiple index sets and blocks (if only a singular set of spectrum is needed) or estimated locally (if localized versions are more desirable). The estimated spectra are critical in two ways. First, the estimated ambient noise spectra provide an input parameter to the denoising processing module for setting the model order, rank parameter, or soft-thresholding levels. Second, the estimated ambient noise spectra provide a frequency-dependent approach for signal recovery and noise suppression that can perform significantly better in the presence of complex events when compared to frequency-independent approaches.

Figure 7:
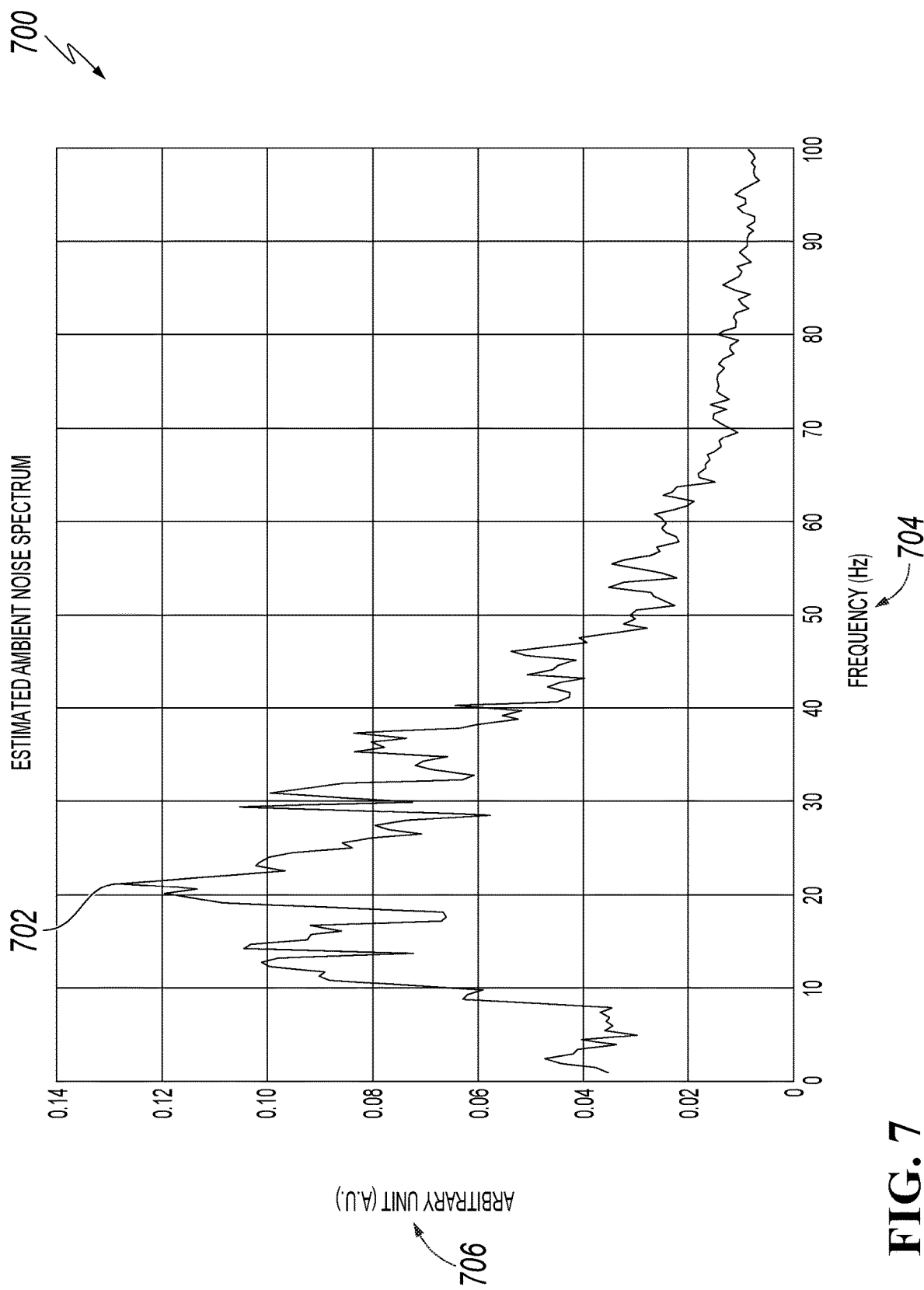
FIG. 7 is a graph illustrating an example estimated ambient noise spectrum, according to an implementation of the present disclosure.

For example, turning to FIG. 7, FIG. 7 is a graph 700 illustrating an example estimated ambient noise spectrum 702, according to an implementation of the present disclosure. For example, the estimated ambient noise spectrum is graphed as frequency (Hz) 704 against a power spectral density of the data (for example, power per frequency band) 706 expressed in A.U. Returning from FIG. 7, from 506, method 500 proceeds to 508.

At 508, after being sorted into index sets and partitioned into blocks, a data subset for the qth index set and pth block, denoted as $y_p$ ($t_i$, $x_j$), is then processed for noise removal, including both random and erratic noises. For clarification, the method illustrated in FIG. 5 is typically applied to each index set, hence the index q is dropped. Within each index set (for example, a common shot gather) the data is further partitioned into a number of blocks, indexed by p). Note that generally global extreme value detection and removal are done prior to partitioning. However, as a normal range of values may change from one local region to another, partitioning could be done in advance of global extreme value detection and removal. From 508, method 500 proceeds to 510.

At 510, $y_p(t_i, x_j)$ is Fourier-transformed into a frequency domain, $y_p$ ($f_k$, $x_j$). From 510, method 500 proceeds to 512.

At 512, for each frequency slice $f=f_k$, $k=1 \ldots K$, the sequence $y_p$ ($f_k$, $x_j$) for $j=1, \ldots, N_x$ is processed (at 514), using the parameter specified by $\sigma^2(f_k)$. For example, the sequence $y_p(f_k, x_j)$ for $j=1, \ldots, N_x$ can be processed using an Adaptive Robust Singular Spectrum Analysis (ARSSA) processing module. The processing output includes an estimated clean signal slice at frequency $f=f_k$, $y_{pr}$ ($f_k$, $x_j$), which is derived from a low-rank approximation to a Hankel matrix formed using an input noisy frequency slice and an erratic noise estimate, denoted as $S_{pr}(f_k,x_j)$. For example, turning to FIG. 8, FIG. 8 illustrates a Hankel matrix D(ω) 800 of a data sequence $d_n(\omega)$ at a given frequency band, according to an implementation of the present disclosure. FIG. 8 serves to generically illustrate a Hankel matrix and obtaining a Hankel matrix by arranging a vector sequence into a matrix in a particular way. Returning to FIG. 5, from 514, method 500 proceeds to 516.

At 516, all $y_{pr}$ ($f_k$, $x_j$), for $k=1 \ldots K$ are collected and an inverse Fourier transform is applied yielding $y_{pr}$ ($t_i$, $x_j$). From 516, method 500 proceeds to 518.

At 518, $y_{pr}$ ($t_i$, $x_j$) is assembled together from each block and each index set to obtain the recovered clean signal events $y_r$ ($t_i$, $x_j$). After 518, method 500 stops.

Figure 6:
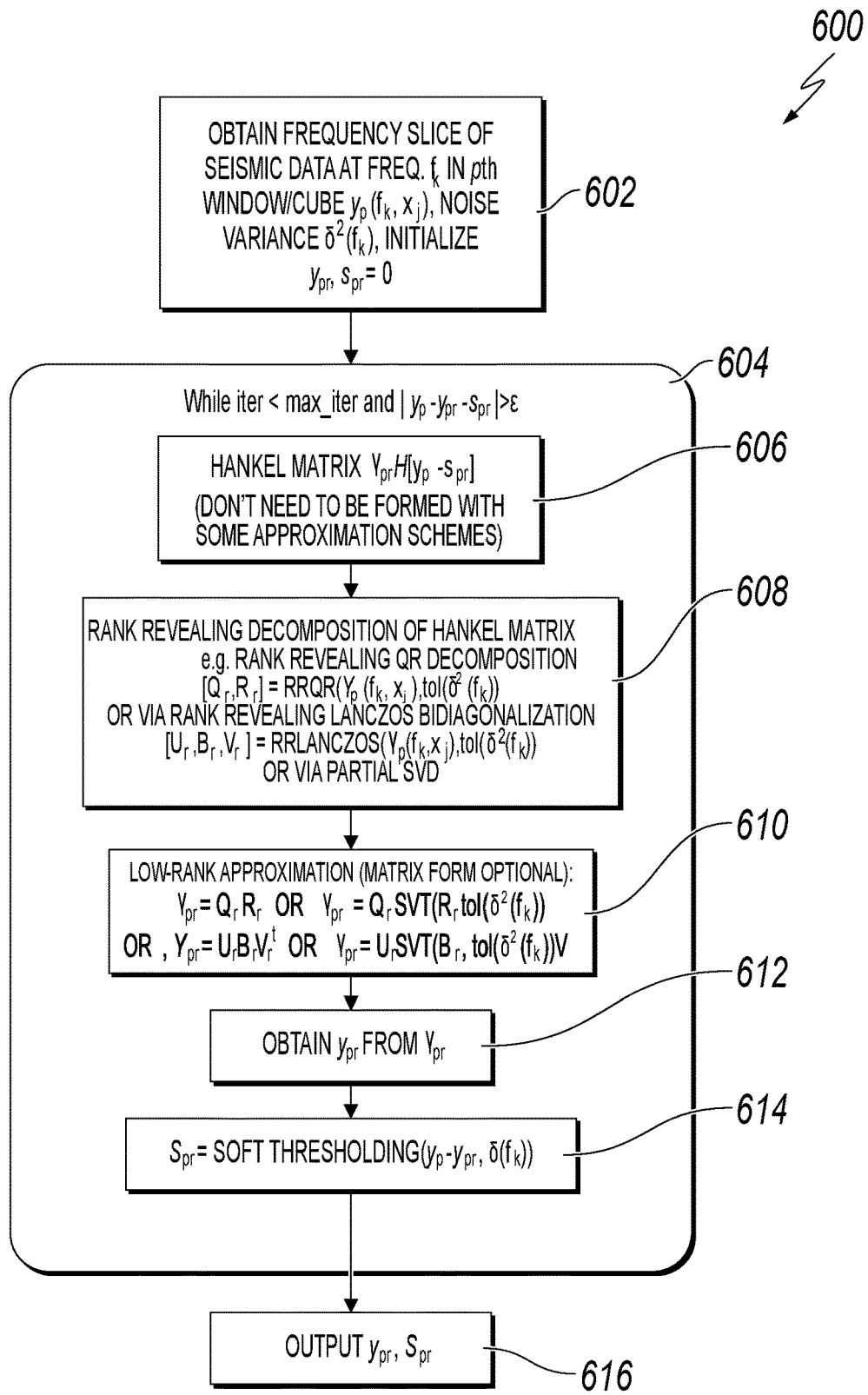
FIG. 6 is a flowchart of an example method for an adaptive robust denoising technique, according to an implementation of the present disclosure.

FIG. 6 is a flowchart of an example method 600 for an adaptive robust denoising method, according to an implementation of the present disclosure. For clarity of presentation, the description that follows generally describes method 600 in the context of the other figures in this description. However, it will be understood that method 600 may be performed, for example, by any suitable system, environment, software, and hardware, or a combination of systems, environments, software, and hardware as appropriate. In some implementations, various steps of method 600 can be run in parallel, in combination, in loops, or in any order.

At a high-level, the described adaptive robust denoising method includes: 1) adaptive rank revealing and low-rank approximation methods in robust SSA; 2) rank determination and singular value thresholding and erratic noise thresholding based on the estimated ambient noise spectral magnitude at each frequency band; and 3) a vector optimization framework for solving low-rank and sparse matrix approximation problems, which is computationally and memory-wise more efficient, and performance-wise more consistent across all receivers.

As previously stated, robust SSA denoising using simultaneous low-rank and sparse estimation decomposes data into signals, random and erratic noises. Signals are recovered from low-rank components of a Hankel matrix of each frequency slice of the data and erratic noises are removed as the sparse components from the residual.

At 602 (corresponding to data at 512/514 of FIG. 5), a frequency slice of seismic data at frequency f in a $p^{th}$ window/cube is obtained. From 602, method 600 proceeds to 604.

At 604, during a defined iteration (prior to iteration convergence or reaching a maximum allowed number of iterations), method 600 performs 606-614. The high-level goal of the iterative procedure is to better approximate $y_p$ (input data) with the sum of $y_{pr}$ (clean signal) and $S_{pr}$ (erratic noise). This approximation is a nonlinear problem given the respective constraints (therefore there is no single step optimization solution and the processing needs to be solved iteratively). The stopping criteria here are given at 604, when an approximation error is smaller than a given level of epsilon (or, in the case this does not occur, after a maximum number of iterations). From 604, method 600 proceeds to 606.

At 606, a Hankel matrix is formed for the adaptive robust denoising method 600. For each frequency slice, as expressed in Equation (4):

$$\hat{s} = \mathcal{A} \left( \mathcal{M}_\mathcal{R} \left( \mathcal{H} (d) \right) \right) \tag{4}$$

where $\mathcal{M}_\mathcal{R}$ denotes the operator for solving the low-rank matrix recovery problem, $\mathcal{A}$ denotes the antidiagonal averaging operator; s is the reconstructed frequency slice. Let $\tilde{M}$ denotes the Hankel matrix from the completely sampled data $\tilde{d}$, that is, $\tilde{M} = \mathcal{H}(\tilde{d})$. $\mathcal{H}$ denotes the Hankel operator and d is a chosen dimensionality (for example, refer to FIG. 8).

The robust SSA algorithm explicitly decomposes the Matrix M to express in terms of three components, as expressed in Equation (5):

$$\tilde{M} = L + S + N \tag{5}$$

where L is the low rank matrix embedded from the f-x signal, S is a sparse matrix corresponding to impulsive noise and N is a dense perturbation matrix representing Gaussian noise.

Suppressing both impulsive and Gaussian noise or estimating L from $\tilde{M}$ can be achieved by solving the following convex minimization problem, as expressed in Equation (6):

$$\min_{L,S}\|L\|_* + \lambda\|S\|_1 \tag{6}$$

subject to:

$$\|P_\Omega(\tilde{M} - L - S)\|_F \leq \delta,$$

where λ is the weighting factor for the sparsity of the erratic noise, $\|L\|$ denotes the nuclear norm of matrix L which is equal to the sum of its singular values, $\|S\|_1$ denotes the $l_1$ norm of the matrix S which is the sum of the absolute values of all the matrix entries, $P_\Omega$ is the projection matrix mapping data onto observed locations in the case of incomplete measurements.

The penalized Lagrangian for the convex minimization problem, as expressed in Equation (6), is as expressed in Equation (7):

$$\min_{L,S}\|L\|_* + \lambda\|S\|_1 + \frac{1}{2\mu}\|P_\Omega(\tilde{M} - L - S)\|_F^2, \tag{7}$$

where μ is a parameter weighting on the Frobenius norm of the Gaussian noise in the observed data location. The problem in Equation (7) can be solved by first order algorithms, such as the augmented Lagrangian based Method (ALM), or approximate proximal gradient (APG) method. The parameters λ and μ need to be tuned properly according to the data structure.

The matrix formulation in Equation (7) has several limitations. First the third misfit term in terms of the matrix Frobenius norm is not consistent across different receivers. As shown in FIG. 8, the receivers closer to the antidiagonal contributes more to the Frobenius norm than those further away from the antidiagonal. Second, the second term in Equation (7), the matrix $l_1$ norm, also has an uneven distribution across different receivers similar to the Frobenius norm. With respect to the misfit and the sparsity penalty, the formulation in Equation (7) has a biased weighting peaked at the antidiagonal receiver and tapered down towards both sides.

As a result of the biased weighting, a vector formulation of Equation (7) is used, as expressed in Equation (8):

$$\min_{l,s}\|\mathcal{H}(l)\|_* + \lambda\|s\|_1 + \frac{1}{2\mu}\|P_\Omega(\tilde{d} - l - s)\|_F^2, \tag{8}$$

which can be similarly solved for l and s using ALM or APG methods, albeit with much less memory requirement and more efficient computation. In addition, the Hankel matrix $\mathcal{H}$ (l) may not need to be explicitly constructed when the certain low-rank approximation form is used, for example, using Lanczos bidiagonalization utilizing an efficient fast Fourier transform (FFT) implementation, exploring the near cyclic structure of the Hankel matrix. This is also true for QR decomposition based low-rank approximation. FIG. 6 illustrates an example diagram illustrating the typical steps that solve Equation (8) using the APG method (a discussion of adaptive low-rank matrix approximation using rank-revealing methods follows). From 606, method 600 proceeds to 608.

At 608 (alternatively instead of 610), adaptive low-rank matrix approximation using rank-revealing methods is performed to determine an optimal rank to choose. One of the key challenges in solving Equation (7) and Equation (8) is to obtain a low-rank approximation to the complex Hankel matrix at each frequency. Existing techniques, both for random and erratic noises, adopt a fixed rank or a fixed singular value thresholding strategy which, given the signal structure variation across frequency and spatial-temporal regions, is an oversimplification and far from an optimal approach.

The level of random noise, associated with the matrix N in Equation (5), can be estimated to reasonable accuracy and more importantly, be provided as an input to determine the parameters λ and μ in Equation (7) and Equation (8). When combined with rank revealing techniques, this provides an adaptive strategy to automatically determine the low-rank approximation.

Additionally, existing techniques often employ SVD which is computationally very expensive, with typical complexity at $O(mn^2)$ for m≥n. The rank-revealing QR (RRQR) decomposition or Lanczos bidiagonalization can be significantly more efficient with complexity at O(mnr), especially when m, n>>r.

Denoting $y_{pr}(f_k,x_j)$ as the complex data sequence at frequency $f=f_k$, and $Y_p=H[y_p(f_k,x_j)-S_{pr}(f_k,x_j)]\in C^{m\times n}$ as the associated Hankel matrix, the RRQR decomposition with column pivoting, as expressed in Equation (9), yields:

$$Y_p\Pi = [Q_1 \ Q_2]\begin{bmatrix} R_{11} & R_{12} \\ 0 & R_{22} \end{bmatrix}, \tag{9}$$

where Π is a column permuting matrix; $R_{11}\in C^{r\times r}$ and $R_{22}\in C^{(m-r)\times(n-r)}$ are two upper triangular matrices with positive diagonal elements. $Q_1\in C^{m\times r}$ and $Q_2\in C^{m\times(m-r)}$ are two unitary matrices forming the signal and null subspaces of $Y_p\Pi$. The column permuting matrix Π is computed such that the diagonal elements of $R_{11}$ are sorted in descending order and that $\|R_{22}\|_2\leq\sigma(f_k)$, the previously estimated ambient noise floor. Then one may conclude that the rank of the Hankel matrix is r. Properties of square and nonsquare Hankel matrices can be considered.

Note that given the special structure of the Hankel matrix, all the computations involved in RRQR can be implemented using the vector $y_p(f_k, x_j)-S_{pr}(f_k, x_j)$ without explicitly forming or storing $Y_p$, which in the case of large block size can help reduce computational memory requirement. The computational complexity of RRQR is approximately O(mnr) flops.

In cases where erratic noises interfere with RRQR, for instance in column pivoting, it can be helpful to compute another step of singular value thresholding on $[R_{11} \ R_{12}]$ to stabilize against the erratic noises. The added complexity is $O(nr^2)$, which for low-rank is insignificant.

As a result, the low-rank approximation to $Y_p$, denoted as $Y_{pr}$, can, as expressed in Equation (10), be obtained as:

$$Y_{pr}=Q_1[R_{11}R_{12}]\Pi^t \tag{10}$$

with RRQR only, or, as expressed in Equation (11):

$$Y_{pr}=Q_1SVT([R_{11}R_{12}],tol(\sigma(f_k))) \tag{11}$$

with RRQR followed by singular value thresholding. Here SVT(A, σ)=Udiag(max($\lambda_i$−σ,0))$V^t$ is the singular value soft-thresholding operator, with $A=U\Lambda V^t$ being the SVD of A. The threshold level to $1(\sigma(f_k))=(\sqrt{m}+\sqrt{n})\sigma(f_k)$.

From 608, method 600 proceeds to 612.

At 610 (alternatively instead of 608), instead of RRQR decomposition, rank-revealing Lanczos bidiagonalization (RRLB) can be used to obtain a low-rank approximation to the Hankel matrix at each frequency slice. The Lanczos bidiagonalization of $Y_p$, as expressed in Equation (12), is given as:

$$Y_p = U \begin{bmatrix} B \\ 0 \end{bmatrix} V^t, \; U^t U = I_m, \; V^t V = I_n, \quad (12)$$

with B upper bidiagonal, as expressed in Equation (13), given as:

$$B = \begin{bmatrix} \alpha_1 & \beta_1 & & & \\ & \alpha_2 & \beta_2 & & \\ & & \ddots & \ddots & \\ & & & \alpha_{n-1} & \beta_{n-1} \\ & & & & \alpha_n \end{bmatrix} \in R^{n \times n}. \quad (13)$$

It is known that $\alpha_j$ and $\beta_j$ can be recursively computed along with $u_j$ and $v_j$, the columns of U and V. The recursion stops when $\alpha_j \leq f(\sigma)$, revealing rank of B; hence for $Y_p$, r=j. The advantage of using the Lanczos bidiagonalization is the possibility of using efficient one-dimensional (1D) FFT for the matrix vector product involved in the recursion.

The resulting low-rank approximation would be, as expressed in Equation (14):

$$Y_{pr} = U_r B_r V_r^t \quad (14),$$

with RRLB only, or, as expressed in Equation (15):

$$Y_{pr} = U_r SVT(B_r, tol(\sigma(f_k))) V_r^t \quad (15),$$

with RRLB followed by singular value thresholding of $B_r$.

Other possible alternatives include partial SVD using random projection. From 610, method 600 proceeds to 612.

At 612, $y_{pr}$ is obtained from $Y_{pr}$. $Y_{pr}$ is the Hankel matrix constructed from the vector $y_{pr}$. As FIG. 8 illustrates, knowing a vector allows construction of a Hankel matrix. In the same way, knowing a Hankel matrix, a vector can be recovered. From 612, method 600 proceeds to 614.

At 614, with $Y_{pr}$ (or equivalently $y_{pr}$), the erratic noise component $s_{pr}$ can be obtained using element wise soft-thresholding, as expressed in Equation (16):

$$s_{pr} = \text{soft-thresholding}(y_p - y_{pr}, \sigma(f_k)) = \max(y_p - y_{pr}, -\sigma(f_k)) \quad (16).$$

From 614, a determination is made whether the iteration at 604 converges or reaches the maximum allowed number of iterations. If the iteration at 604 has not converged or reached the maximum allowed number of iterations, method 600 returns back to 604. Otherwise, the resulting $y_{pr}$ (clean signal) and $s_{pr}$ (erratic noise component) is provided in 616 to 514 in FIG. 5 as the estimate of the denoised signal component for the current frequency slice of seismic data at frequency f in the $p^{th}$ window/cube).

An advantage of the previously described adaptive robust denoising method is the use of a frequency dependent ambient noise floor in setting the processing parameters, specifically a threshold level for singular value soft-thresholding in robust SSA, or the effective rank in RRQR or RRLB. Therefore, the described method adapts to signal characteristics across different frequency bands and may select a different SVD threshold level or rank for the Hankel matrix at each frequency, adjusted according to a corresponding ambient noise floor estimate at that frequency.

This results in an improved capability for denoising data with complex events compared to methods with frequency independent processing. For instance, a complex curved event within a particular frequency band may need a large number of singular value components or a high-rank representation at that frequency. However, if the same number of singular value components or large rank is applied to another frequency band where there is only simple or little signal structure, it will increase the noise inclusion in the output.

Figure 9B:
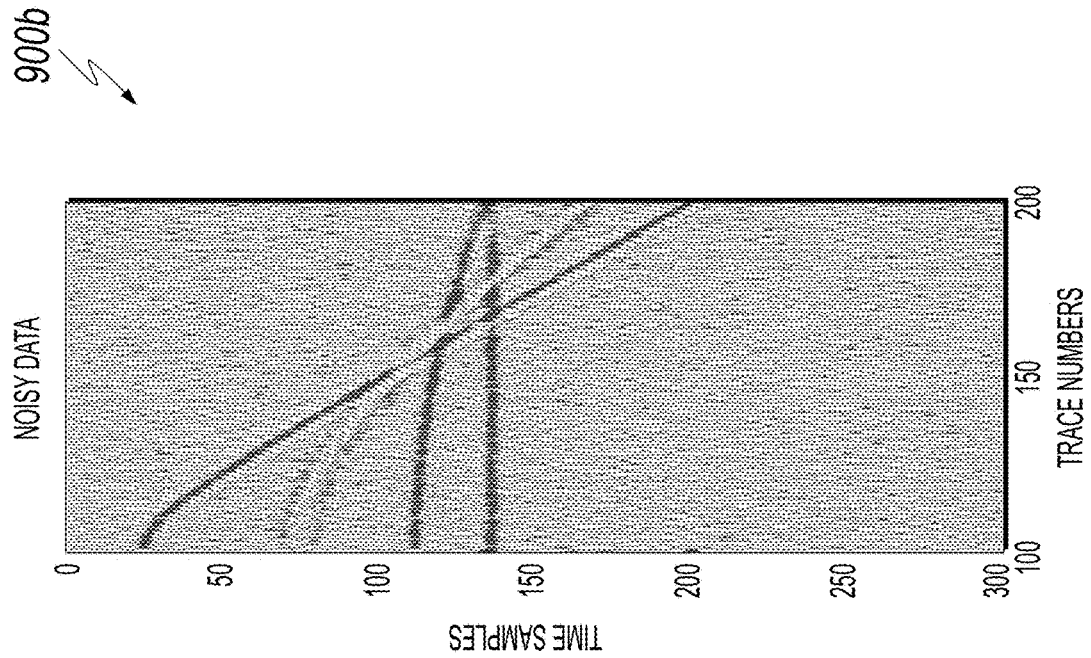
FIGS. 9A-9D illustrate results with a small field synthetic data set containing four realistic and complex hyperbolic events, according to an implementation of the present disclosure.
Figure 9A:
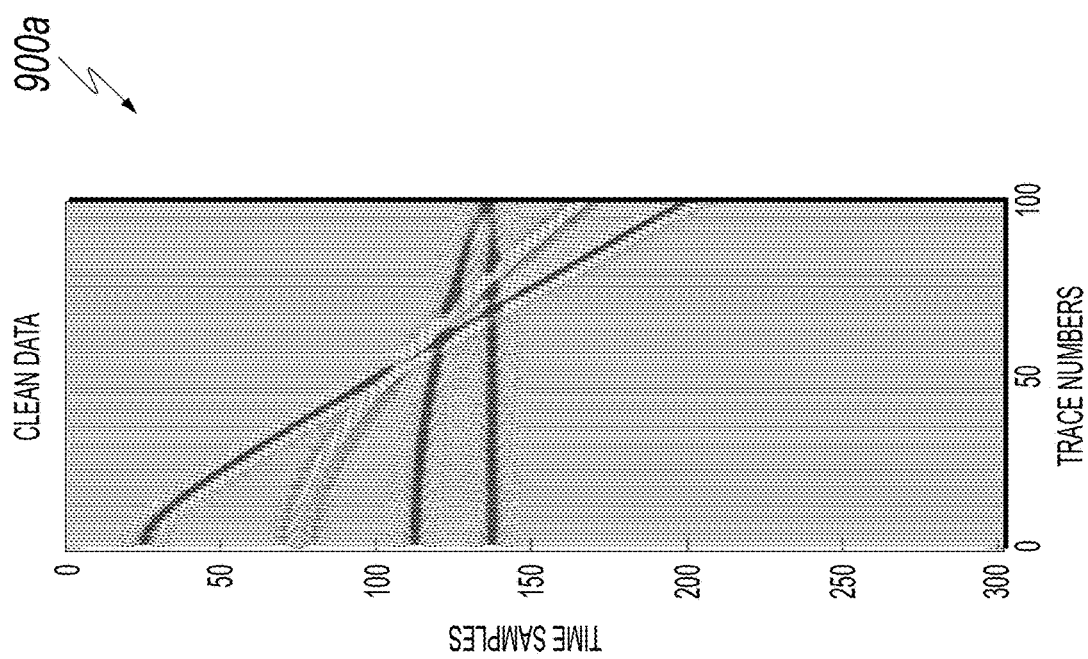
Figure 9D:
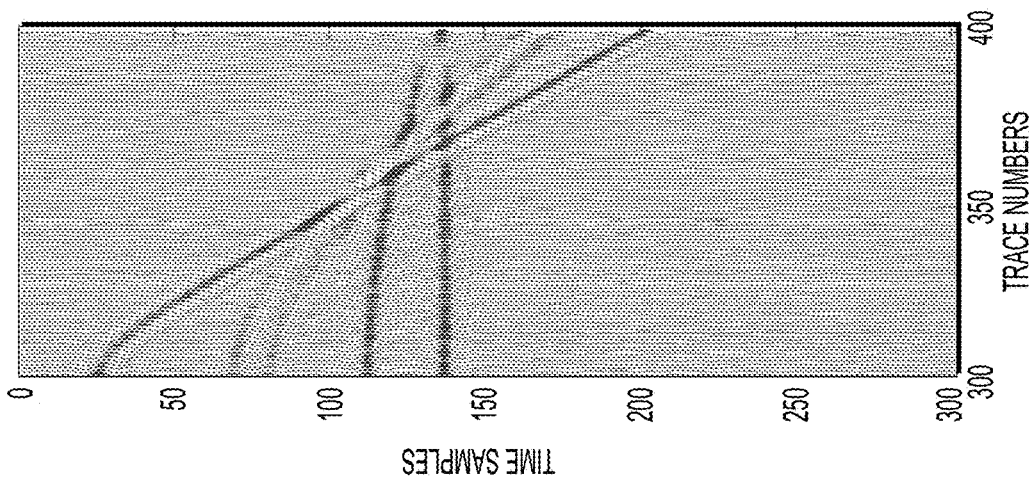
Figure 9C:
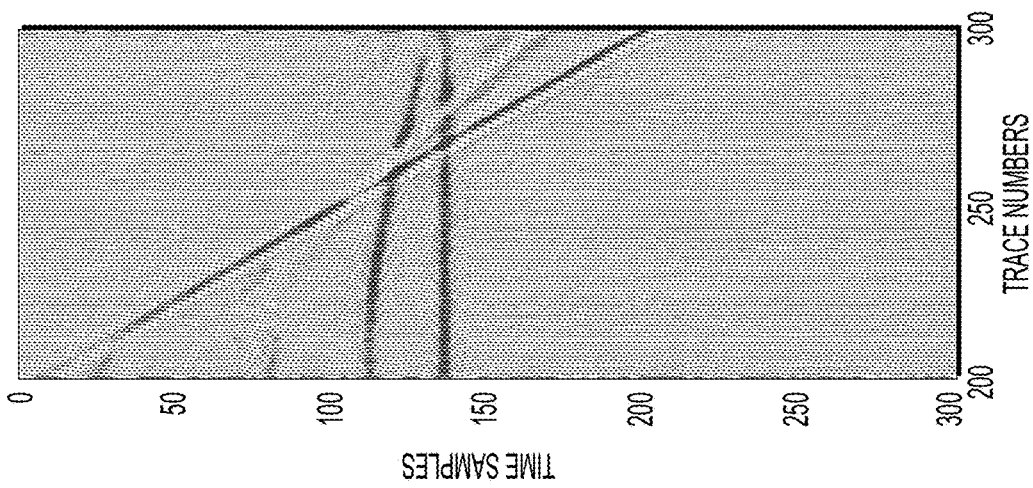

Turning to FIGS. 9A-9D, FIGS. 9A-9D illustrate results 900a-900d, respectively, with a small-field synthetic data set containing four realistic and complex hyperbolic events, according to an implementation of the present disclosure. Here, FIG. 9A illustrates clean data with 4 hyperbolic events, FIG. 9B illustrates noisy data with SNR=3, FIG. 9C illustrates SSA denoising output with P=4, and FIG. 9D illustrates adaptive SSA denoising output. Note that the regular SSA method suffers significant signal distortion at rank=4 uniformly across all frequency bands. By comparison, in FIG. 9D, the adaptive SSA using RRQR with frequency-dependent ambient noise floor produces much improved signal recovery.

Figure 10B:
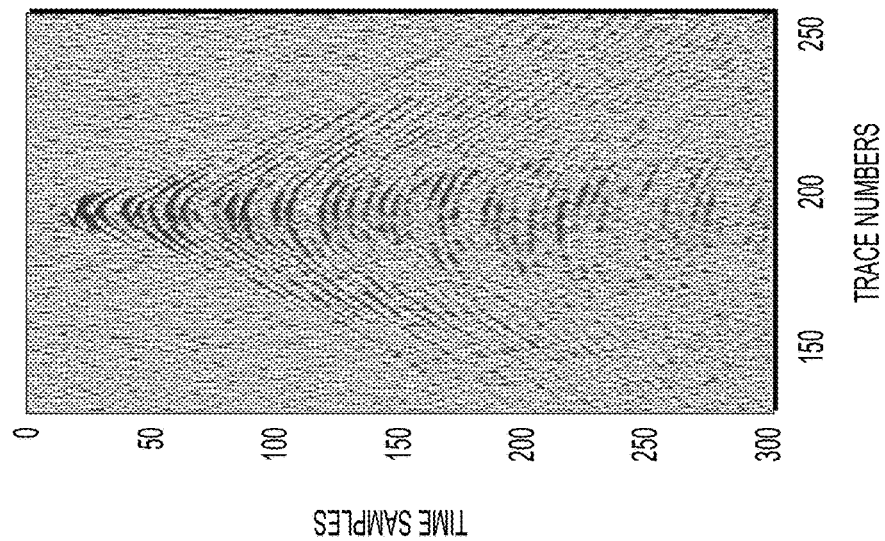
FIGS. 10A-10D illustrate differences between recovered signals and original clean signals as well as noisy input, according to an implementation of the present disclosure.
Figure 10A:
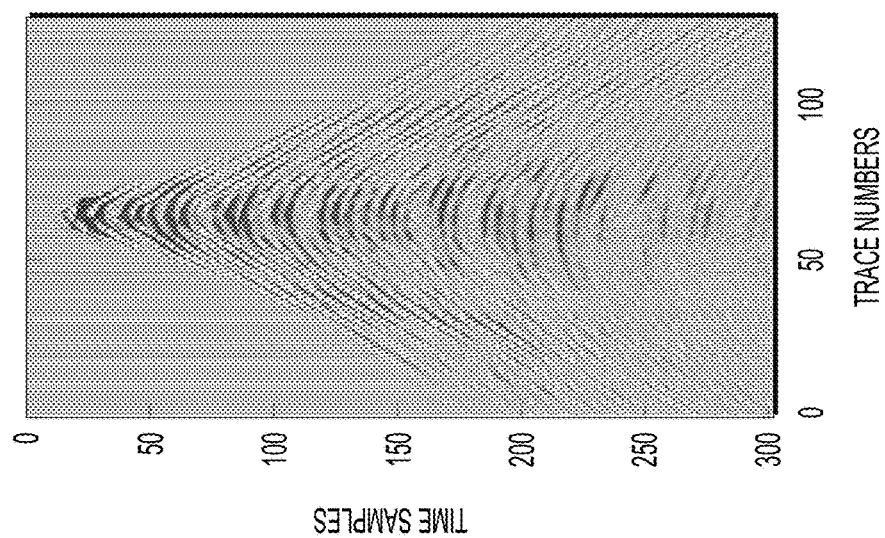
Figure 10C:
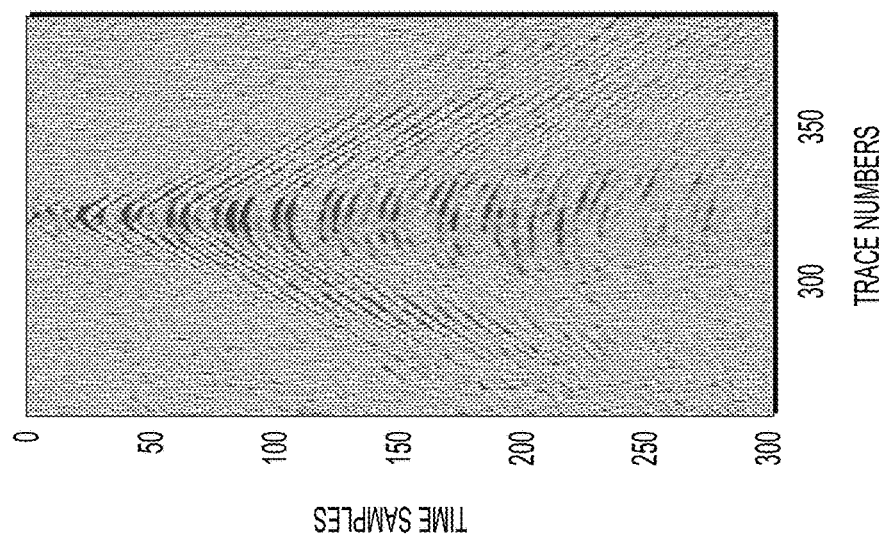
Figure 10D:
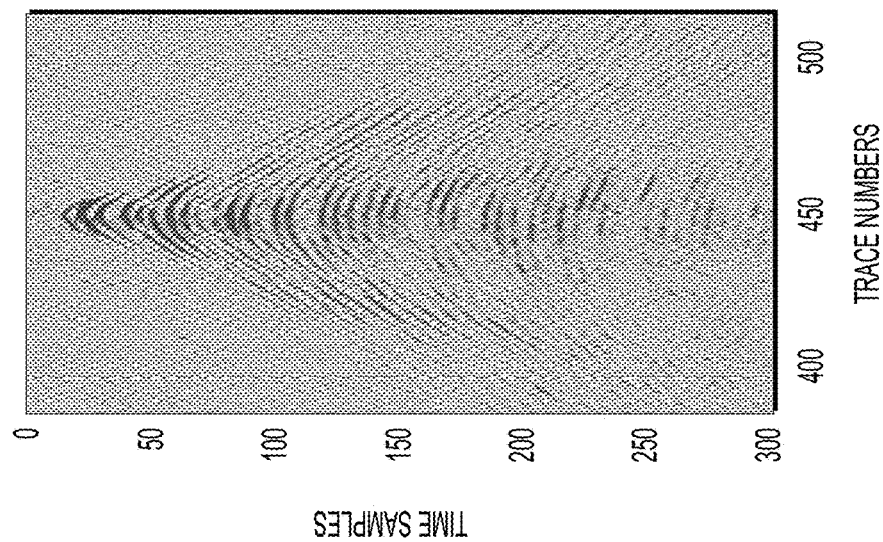

Turning to FIGS. 10A-10D, FIGS. 10A-10D illustrate using frequency-dependent rank-reduction Adaptive SSA to improve recovered complex event signals, according to an implementation of the present disclosure. Differences 1000a-1000d, respectively, are illustrated between recovered signals and original clean signals as well as noisy input. Here, FIG. 10A illustrates a clean shot gather $d_0$, FIG. 10B illustrates a noisy shot gather with SNR=3, FIG. 10C illustrates SSA denoising output of $d_{ssa}$ with P=10, and FIG. 10D illustrates adaptive SSA denoising output $d_a$. By comparison, the adaptive SSA produces significantly lower signal distortion.

Figures 11D, 11E, 11F:
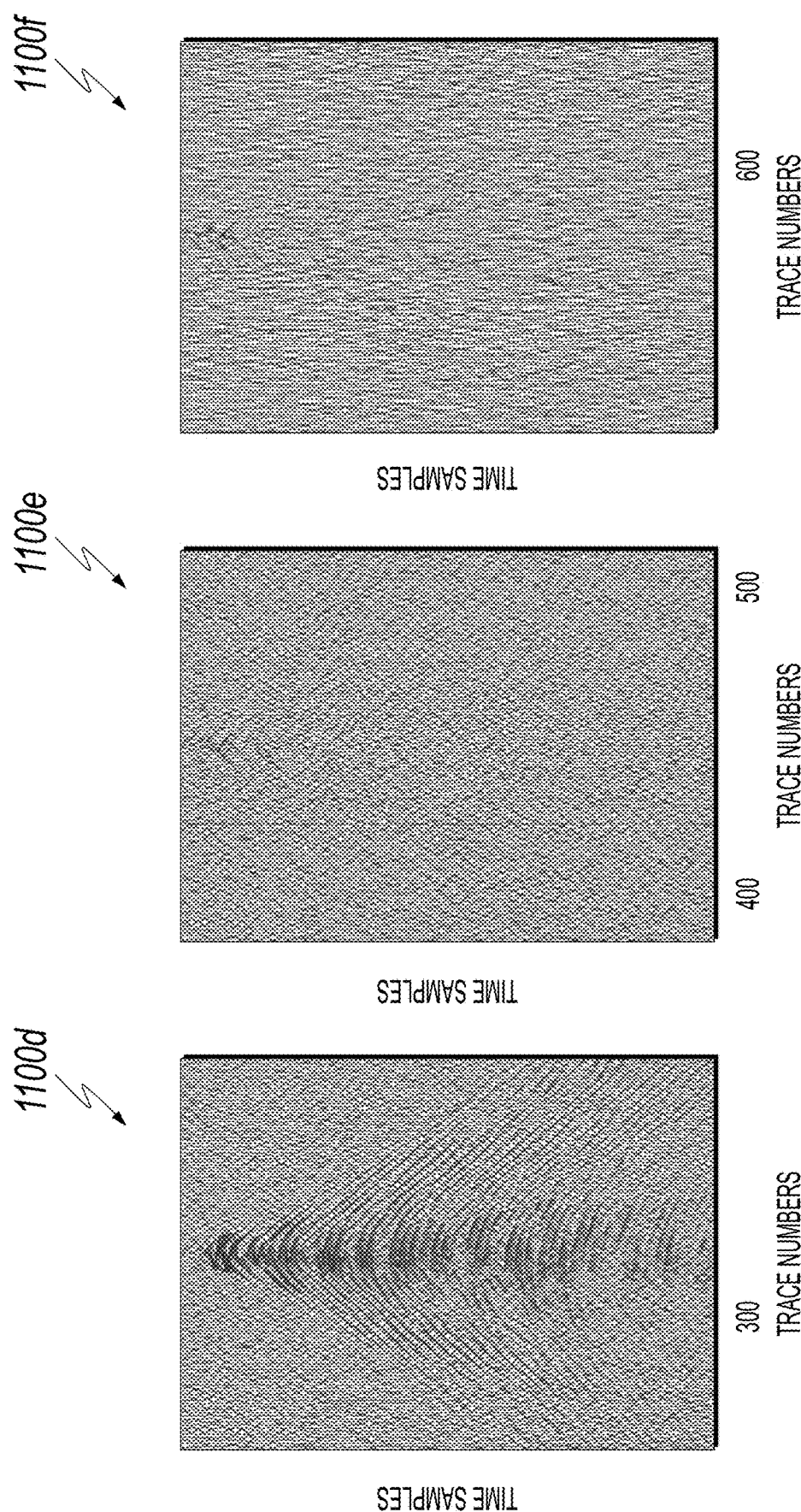

Turning to FIGS. 11A-11F, FIGS. 11A-11F illustrates that adaptive SSA with frequency-dependent rank reduction produces significantly smaller signal distortion for complex events, according to an implementation of the present disclosure. For example, FIG. 11A 1100a illustrates SSA denoising output $d_{ssa}$ with P=10, FIG. 11B 1100b illustrates $d_0-d_{ssa}$, FIG. 11C 1100c illustrates $d-d_{ssa}$, FIG. 11D 1100d illustrates Adaptive SSA denoising output $d_a$, FIG. 11E 1100e illustrates $d_0-d_a$, and FIG. 11F 1100f illustrates $d-d_a$.

Figure 12:
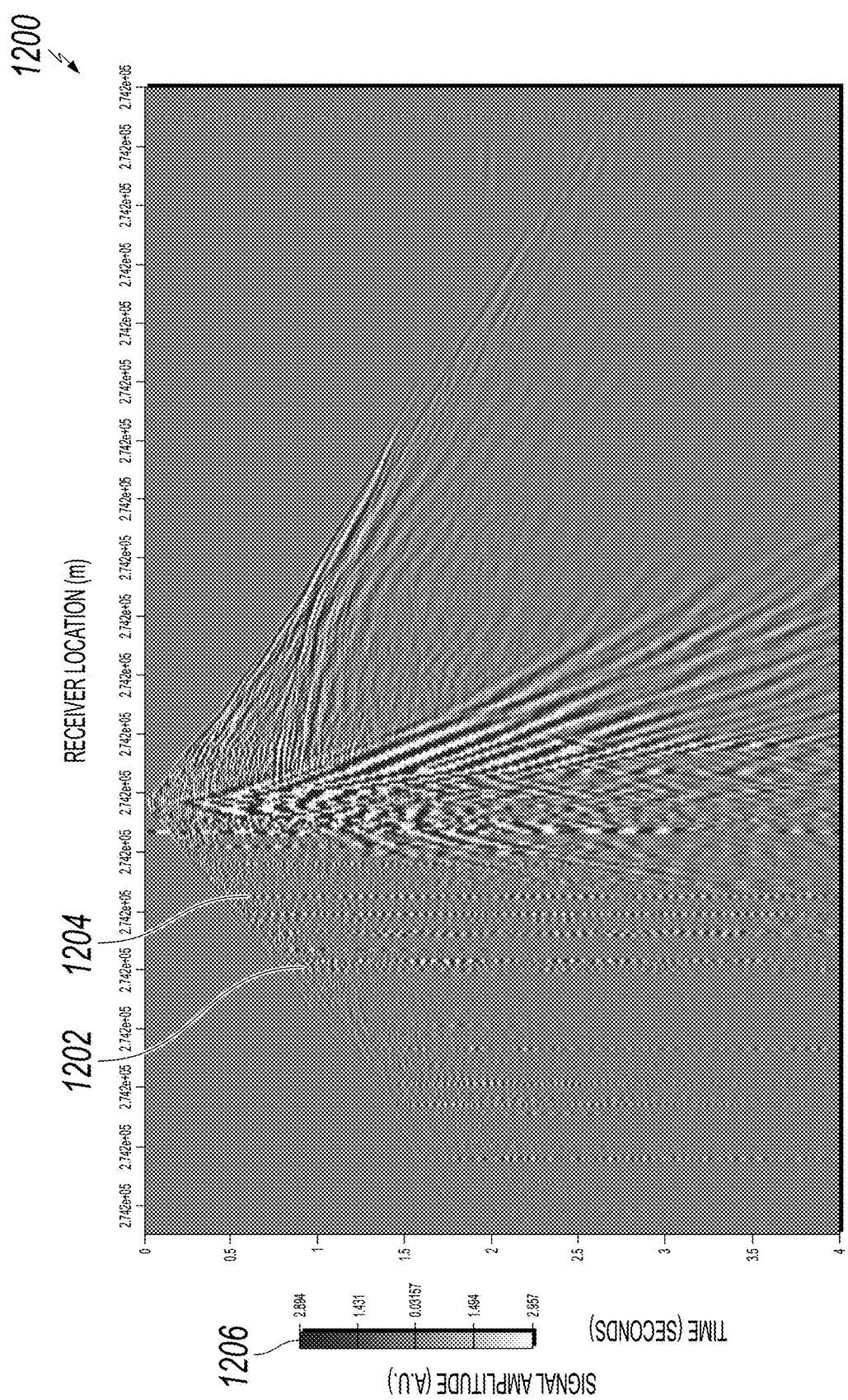
FIG. 12 illustrates an example shot gather from field data containing a large number of erratic noises, according to an implementation of the present disclosure.

Applying the described adaptive low-rank approximation with rank-revealing decomposition of the Hankel matrix in robust SSA leads to a performance gain, especially for data set with substantial variations across different spatial-temporal regions. Turning to FIG. 12, FIG. 12 illustrates an example shot gather 1200 from field data containing a large number of erratic noises, according to an implementation of the present disclosure. The shot gather 1200 is severely contaminated with a large number of erratic noises (for example, 1202 and 1204). In addition, large variations in the signal characteristics can be seen over different receivers as well as along the travel time. Especially interesting is the large dynamic range asymmetry between the receivers and the shot. Color scale 1206 color-codes (in grayscale) signal amplitude of the plotted data in A.U.

Figure 13:
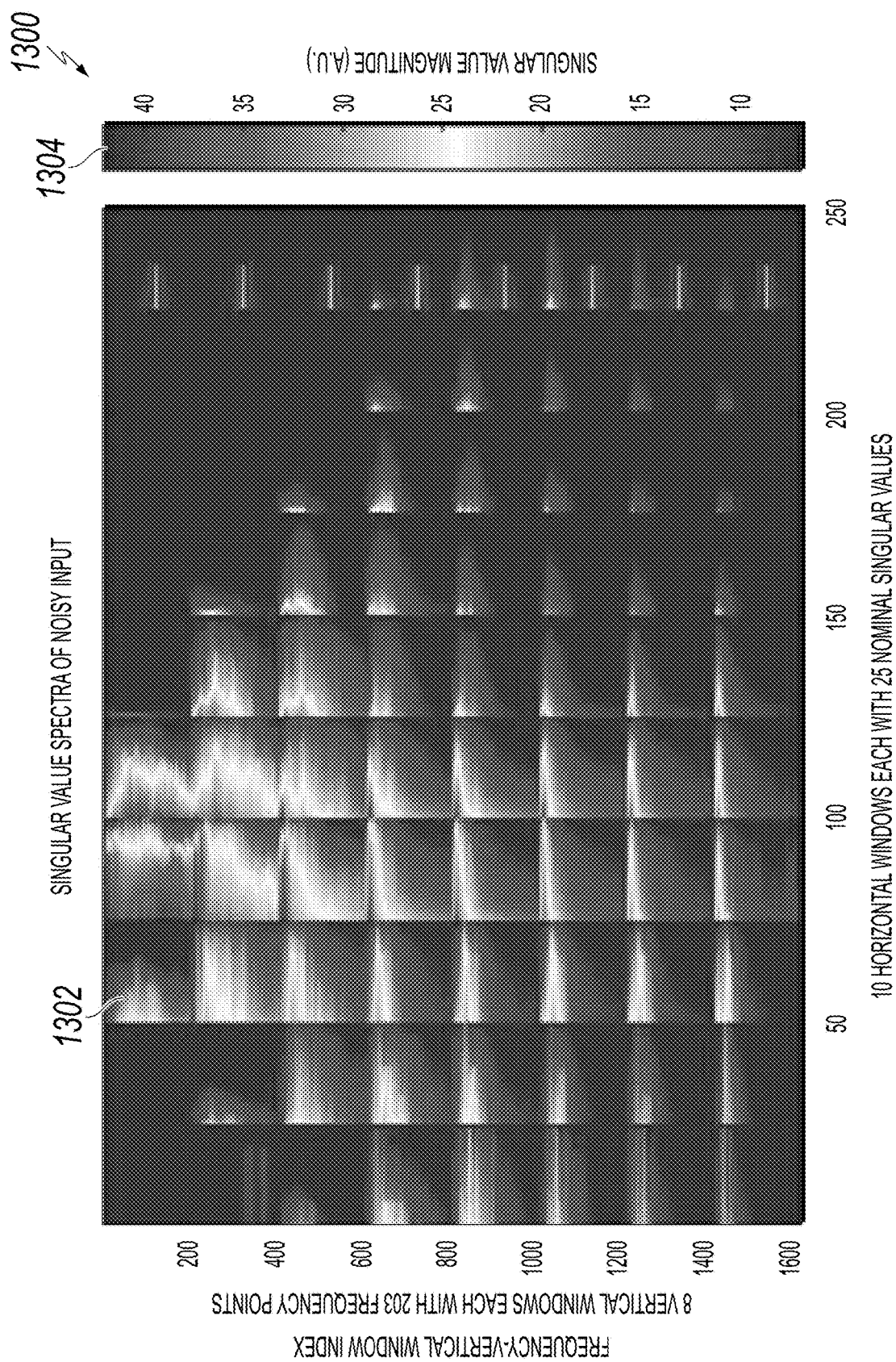
FIG. 13 illustrates singular value spectra plots for the shot gather of FIG. 12, according to an implementation of the present disclosure.

Turning now to FIG. 13, FIG. 13 illustrates singular value spectra plots 1300 for the shot gather 1200 of FIG. 12, according to an implementation of the present disclosure. The singular value spectra plots 1300 are partitioned into 8 (vertical)×10 (horizontal) blocks 1302, and for all frequency bands within each block 1302. Some of the erratic noises have strong line spectra at different frequencies. The variations in the singular value spectra is evident from the color scale 1304 representing singular value magnitude (A.U.). The vertical axis represents the frequency-vertical window index (here, 8 vertical windows each with 203 frequency points as labeled) and horizontal axis represents singular value-horizontal window index (here, 10 horizontal windows each with 25 retained singular values).

Figure 14:
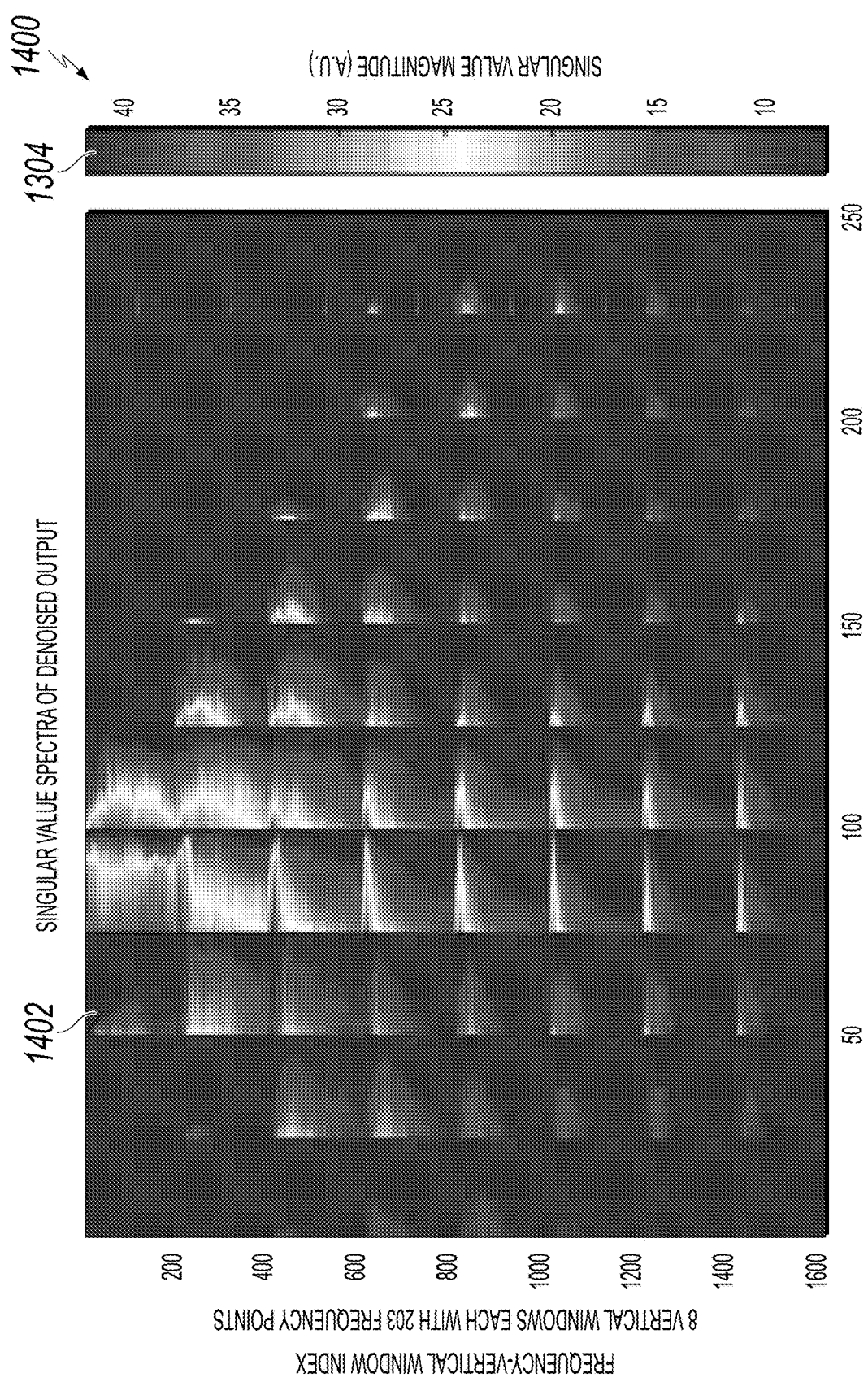
FIG. 14 illustrates denoised output of the singular value spectra of FIG. 13 after using the adaptive robust SSA technique, according to an implementation of the present disclosure.

Turning now to FIG. 14, FIG. 14 illustrates denoised output 1400 of the singular value spectra of FIG. 13 after using the adaptive robust SSA technique, according to an implementation of the present disclosure. For example, block 1402 (corresponding to block 1302) illustrates much less noise than in FIG. 13. The variations in the singular value spectra are evident from the color scale 1304 representing singular value magnitude (A.U.). The unit of the vertical axis is frequency-vertical window index (here, 8 vertical windows each with 203 frequency points as labeled) and the horizontal unit is the singular value-horizontal window index (here, 10 horizontal windows each with 25 retained singular values).

Figure 15:
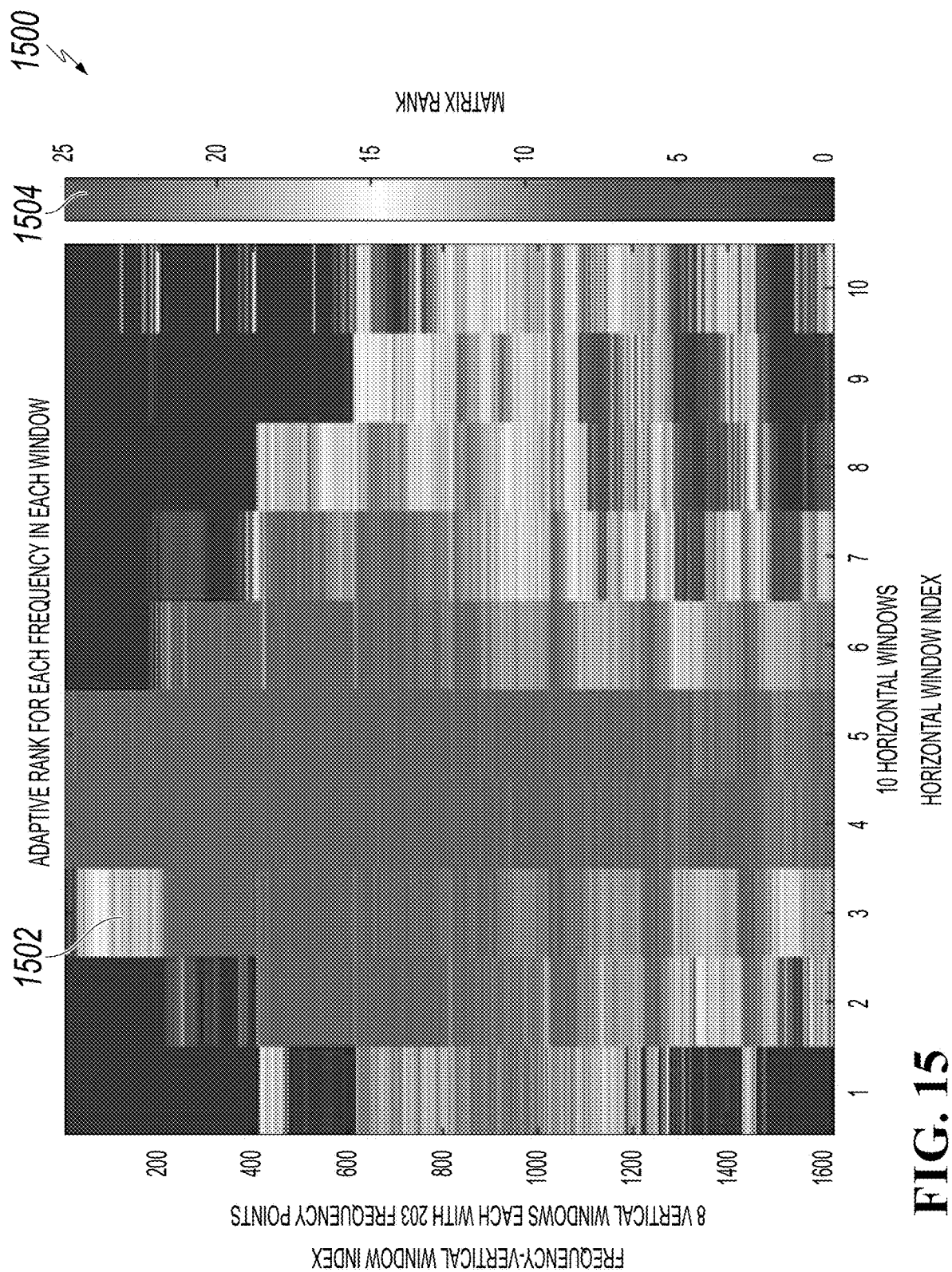
FIG. 15 illustrates reduced ranks adaptively chosen for each frequency in each block during the denoising process from FIGS. 13 and 14, according to an implementation of the present disclosure.

Turning now to FIG. 15, FIG. 15 illustrates reduced ranks 1500 adaptively chosen for each frequency in each block during the denoising process from FIGS. 13 and 14, according to an implementation of the present disclosure. For example, block 1502 (corresponding to blocks 1302 and 1402) shows the reduced matrix rank for each frequency according to the color scale 1504. The unit of the vertical axis is the frequency-vertical window index (here, 8 vertical windows each with 203 frequency points as labeled), similar to that in FIGS. 13-14, the unit of the horizontal axis is horizontal window index (here, 10 horizontal windows), and the color bar 1504 corresponds to the matrix rank (since each data window at each frequency generates a 25×25 Hankel matrix, where the rank is less than 25 and greater than 0).

Figure 16:
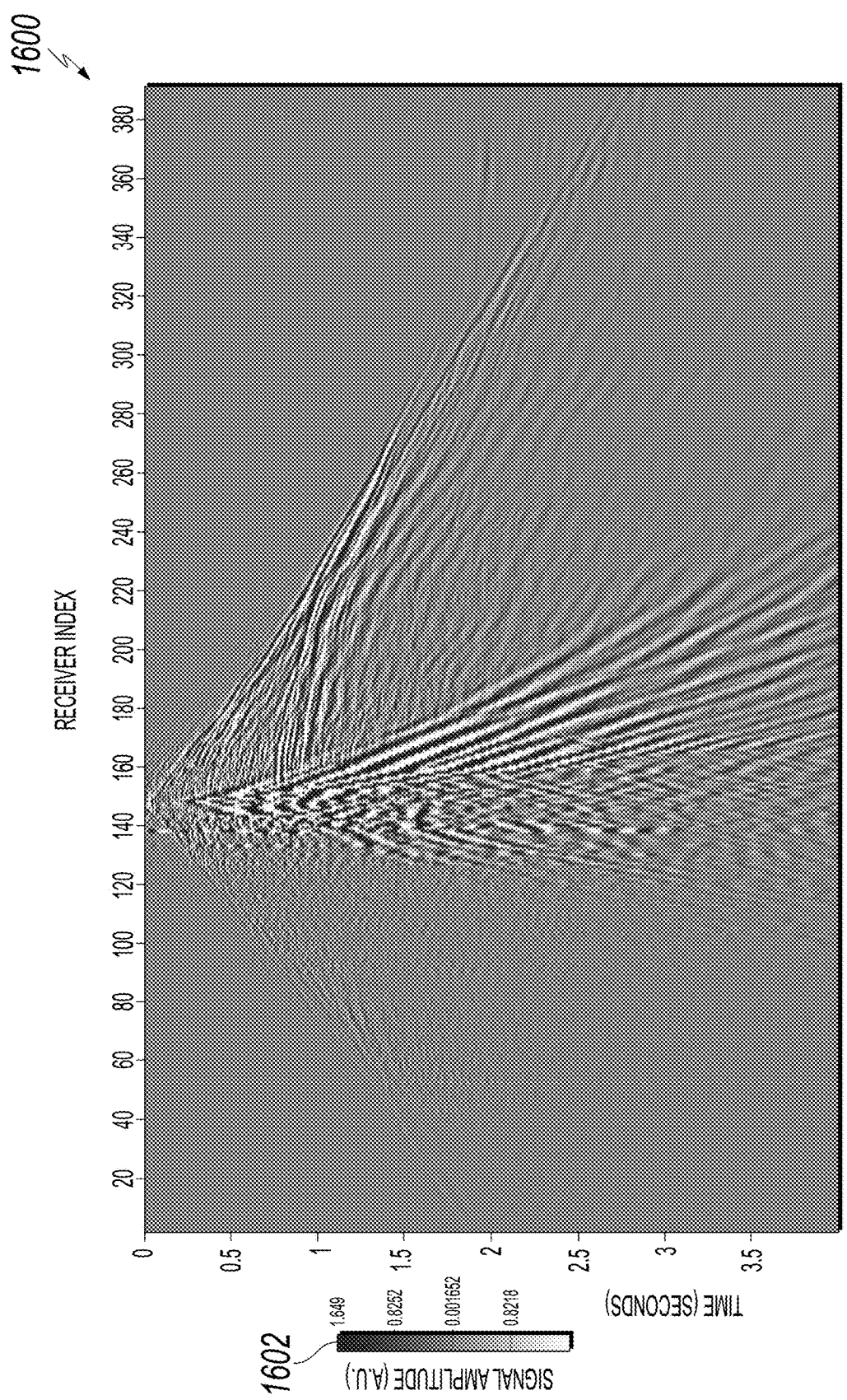
FIG. 16 illustrates a plot of denoised data after using the adaptive robust SSA technique on the data from FIG. 12, according to an implementation of the present disclosure.

Turning now to FIG. 16, FIG. 16 illustrates a plot of denoised data 1600 after using the adaptive robust SSA technique on the data from FIG. 12, according to an implementation of the present disclosure. As illustrated, the erratic noises in FIG. 12 (for example, 1202 and 1204) have been successfully removed and the clean signals are well recovered. Color scale 1602 color-codes (in grayscale) signal amplitude of the plotted data in A.U.

Figure 17:
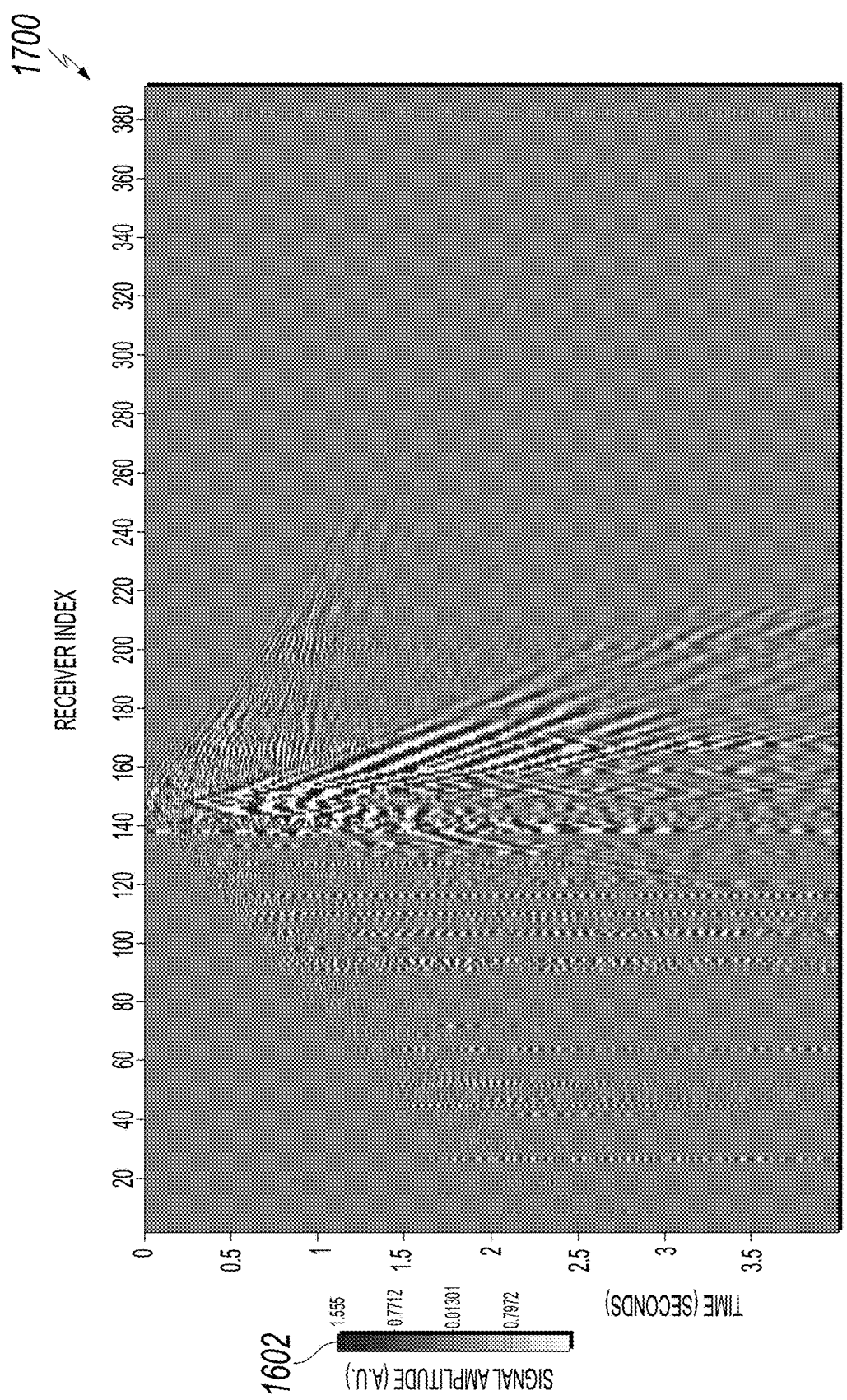
FIG. 17 illustrates the difference between the denoised output of FIG. 16 and the noisy shot gather data of FIG. 12, according to an implementation of the present disclosure.

Turning now to FIG. 17, FIG. 17 illustrates the difference 1700 between the denoised output of FIG. 16 and the noisy shot gather data of FIG. 12, according to an implementation of the present disclosure. FIG. 17 illustrates the effectiveness of the noise suppression with signal distortion limited to part of the ground roll and some high-frequency components outside the processing bandwidth. Color scale 1702 color-codes (in grayscale) signal amplitude of the plotted data in A.U.

Figures 18A, 18B, 18C:
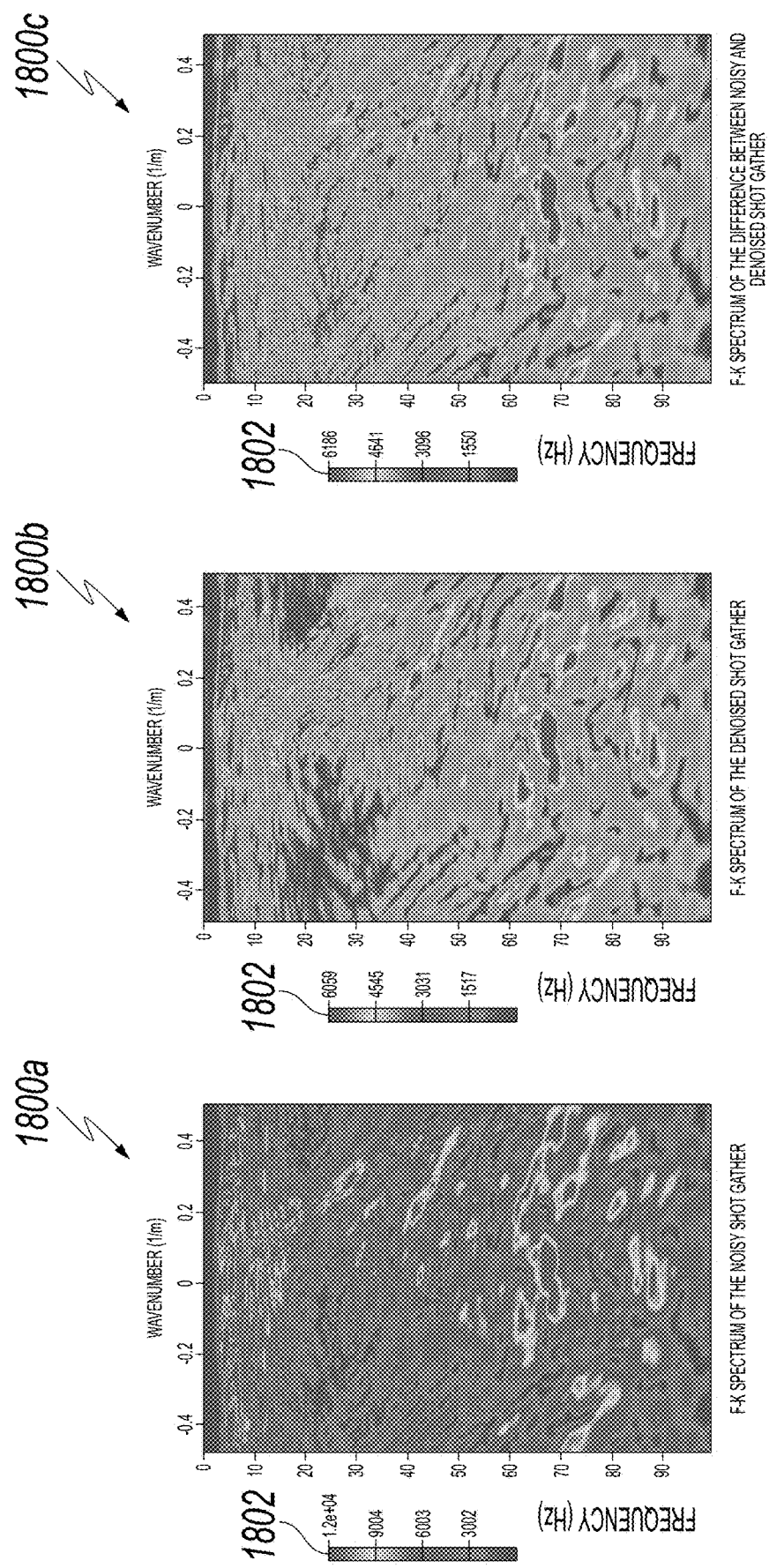
FIGS. 18A-18C illustrate frequency-wavenumber spectra for the noisy input shot gather of FIG. 12, the denoised output of FIG. 16, and the difference of FIG. 17, according to an implementation of the present disclosure.

Turning now to FIGS. 18A-18C, FIGS. 18A-18C illustrate frequency-wavenumber spectra 1800a-1800c, respectively, for the noisy input shot gather of FIG. 12, the denoised output of FIG. 16, and the difference of FIG. 17, according to an implementation of the present disclosure. Specifically, FIG. 18A illustrates f-k spectra of a noisy shot gather d (FIG. 12), FIG. 18B illustrates f-k spectra of the adaptive robust SSA denoising output $d_{arssa}$ (FIG. 16), and FIG. 18C illustrates f-k spectra of the difference (FIG. 17) d-$d_{arssa}$ between the noisy shot gather (FIG. 12) and denoised shot gather (FIG. 16). Color scale 1802 color-codes (in color) signal magnitude of the plotted spectra data in A.U.

Figure 19:
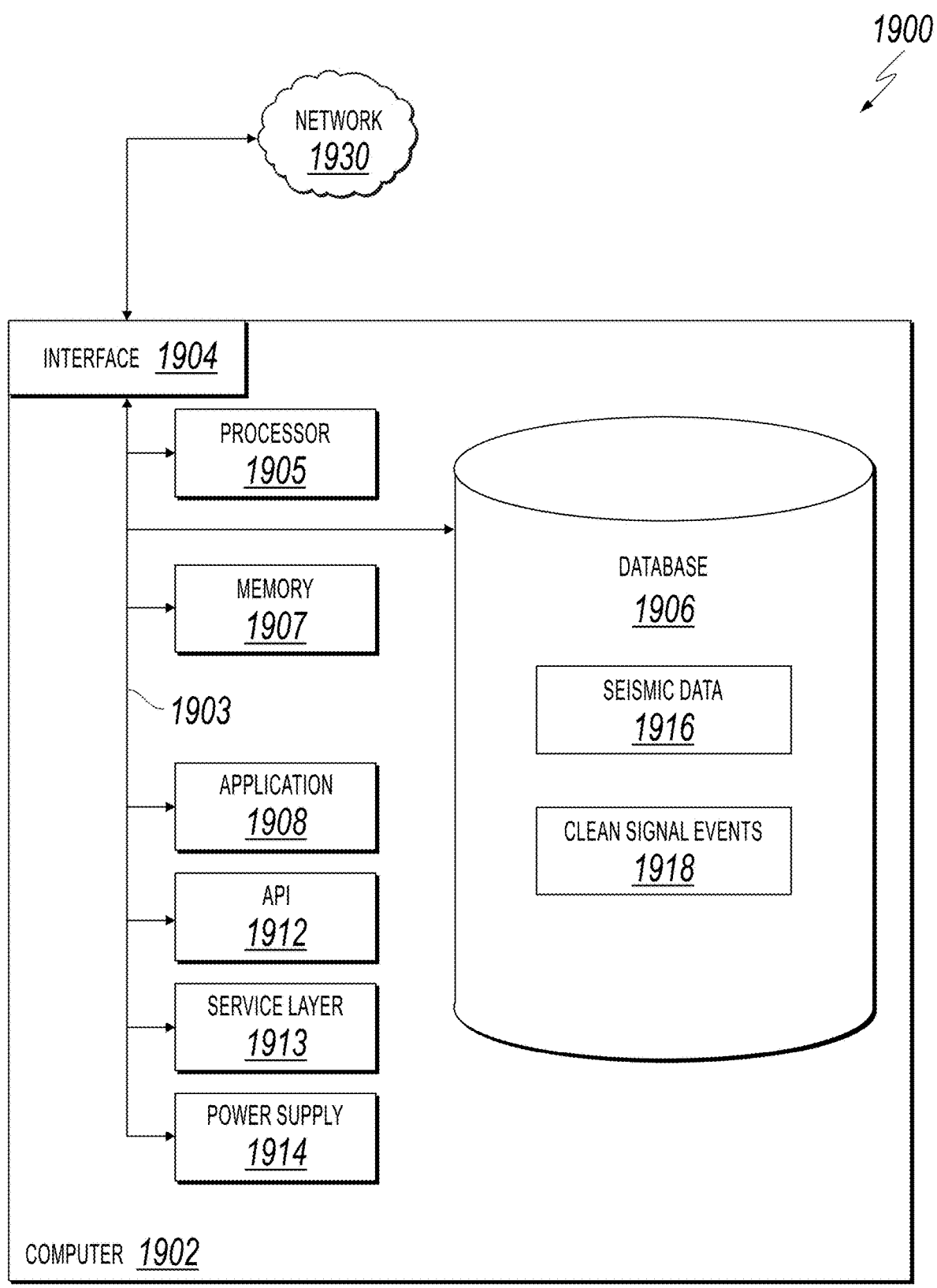
FIG. 19 is a block diagram illustrating an example of a computer-implemented System used to provide computational functionalities associated with described algorithms, methods, functions, processes, flows, and procedures, according to an implementation of the present disclosure. In the illustrated implementation, System 1900 includes a Computer 1902 and a Network 1930.

FIG. 19 is a block diagram illustrating an example of a computer-implemented System 1900 used to provide computational functionalities associated with described algorithms, methods, functions, processes, flows, and procedures, according to an implementation of the present disclosure. In the illustrated implementation, System 1900 includes a Computer 1902 and a Network 1930.

The illustrated Computer 1902 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 1902 can include an input device, such as a keypad, keyboard, touch screen, another input device, or a combination of input devices that can accept user information, and an output device that conveys information associated with the operation of the Computer 1902, including digital data, visual, audio, another type of information, or a combination of types of information, on a graphical-type user interface (UI) (or GUI) or other UI.

The Computer 1902 can serve in a role in a distributed computing system as a client, network component, a server, a database or another persistency, another role, or a combination of roles for performing the subject matter described in the present disclosure. The illustrated Computer 1902 is communicably coupled with a Network 1930. In some implementations, one or more components of the Computer 1902 can be configured to operate within an environment, including cloud-computing-based, local, global, another environment, or a combination of environments.

At a high level, the Computer 1902 is an electronic computing device operable to receive, transmit, process, store, or manage data and information associated with the described subject matter. According to some implementations, the Computer 1902 can also include or be communicably coupled with a server, including an application server, e-mail server, web server, caching server, streaming data server, another server, or a combination of servers.

The Computer 1902 can receive requests over Network 1930 (for example, from a client software application executing on another Computer 1902) and respond to the received requests by processing the received requests using a software application or a combination of software applications. In addition, requests can also be sent to the Computer 1902 from internal users (for example, from a command console or by another internal access method), external or third-parties, or other entities, individuals, systems, or computers.

Each of the components of the Computer 1902 can communicate using a System Bus 1903. In some implementations, any or all of the components of the Computer 1902, including hardware, software, or a combination of hardware and software, can interface over the System Bus 1903 using an application programming interface (API) 1912, a Service Layer 1913, or a combination of the API 1912 and Service Layer 1913. The API 1912 can include specifications for routines, data structures, and object classes. The API 1912 can be either computer-language independent or dependent and refer to a complete interface, a single function, or even a set of APIs. The Service Layer 1913 provides software services to the Computer 1902 or other components (whether illustrated or not) that are communicably coupled to the Computer 1902. The functionality of the Computer 1902 can be accessible for all service consumers using the Service Layer 1913. Software services, such as those provided by the Service Layer 1913, provide reusable, defined functionalities through a defined interface. For example, the interface can be software written in JAVA, C++, another computing language, or a combination of computing languages providing data in extensible markup language (XML) format, another format, or a combination of formats.

While illustrated as an integrated component of the Computer 1902, alternative implementations can illustrate the API 1912 or the Service Layer 1913 as stand-alone components in relation to other components of the Computer 1902 or other components (whether illustrated or not) that are communicably coupled to the Computer 1902. Moreover, any or all parts of the API 1912 or the Service Layer 1913 can be implemented as a child or a sub-module of another software module, enterprise application, or hardware module without departing from the scope of the present disclosure.

The Computer 1902 includes an Interface 1904. Although illustrated as a single Interface 1904, two or more Interfaces 1904 can be used according to particular needs, desires, or particular implementations of the Computer 1902. The Interface 1904 is used by the Computer 1902 for communicating with another computing system (whether illustrated or not) that is communicatively linked to the Network 1930 in a distributed environment. Generally, the Interface 1904 is operable to communicate with the Network 1930 and includes logic encoded in software, hardware, or a combination of software and hardware. More specifically, the Interface 1904 can include software supporting one or more communication protocols associated with communications such that the Network 1930 or hardware of Interface 1904 is operable to communicate physical signals within and outside of the illustrated Computer 1902.

The Computer 1902 includes a Processor 1905. Although illustrated as a single Processor 1905, two or more Processors 1905 can be used according to particular needs, desires, or particular implementations of the Computer 1902. Generally, the Processor 1905 executes instructions and manipulates data to perform the operations of the Computer 1902 and any algorithms, methods, functions, processes, flows, and procedures as described in the present disclosure.

The Computer 1902 also includes a Database 1906 that can hold data for the Computer 1902, another component communicatively linked to the Network 1930 (whether illustrated or not), or a combination of the Computer 1902 and another component. For example, Database 1906 can be an in-memory, conventional, or another type of database storing data consistent with the present disclosure. In some implementations, Database 1906 can be a combination of two or more different database types (for example, a hybrid in-memory and conventional database) according to particular needs, desires, or particular implementations of the Computer 1902 and the described functionality. Although illustrated as a single Database 1906, two or more databases of similar or differing types can be used according to particular needs, desires, or particular implementations of the Computer 1902 and the described functionality. While Database 1906 is illustrated as an integral component of the Computer 1902, in alternative implementations, Database 1906 can be external to the Computer 1902. Database 1906 is shown storing at least obtained seismic data 1914 and clean signal events 1916. While not illustrated, the database 1906 or memory 1907 can store any other data consistent with this disclosure, particular data used in the described methodology.

The Computer 1902 also includes a Memory 1907 that can hold data for the Computer 1902, another component or components communicatively linked to the Network 1930 (whether illustrated or not), or a combination of the Computer 1902 and another component. Memory 1907 can store any data consistent with the present disclosure. In some implementations, Memory 1907 can be a combination of two or more different types of memory (for example, a combination of semiconductor and magnetic storage) according to particular needs, desires, or particular implementations of the Computer 1902 and the described functionality. Although illustrated as a single Memory 1907, two or more Memories 1907 or similar or differing types can be used according to particular needs, desires, or particular implementations of the Computer 1902 and the described functionality. While Memory 1907 is illustrated as an integral component of the Computer 1902, in alternative implementations, Memory 1907 can be external to the Computer 1902.

The Application 1908 is an algorithmic software engine providing functionality according to particular needs, desires, or particular implementations of the Computer 1902, particularly with respect to functionality described in the present disclosure. For example, Application 1908 can serve as one or more components, modules, or applications. Further, although illustrated as a single Application 1908, the Application 1908 can be implemented as multiple Applications 1908 on the Computer 1902. In addition, although illustrated as integral to the Computer 1902, in alternative implementations, the Application 1908 can be external to the Computer 1902.

The Computer 1902 can also include a Power Supply 1914. The Power Supply 1914 can include a rechargeable or non-rechargeable battery that can be configured to be either user- or non-user-replaceable. In some implementations, the Power Supply 1914 can include power-conversion or management circuits (including recharging, standby, or another power management functionality). In some implementations, the Power Supply 1914 can include a power plug to allow the Computer 1902 to be plugged into a wall socket or another power source to, for example, power the Computer 1902 or recharge a rechargeable battery.

There can be any number of Computers 1902 associated with, or external to, a computer system containing Computer 1902, each Computer 1902 communicating over Network 1930. Further, the term "client," "user," or other appropriate terminology can be used interchangeably, as appropriate, without departing from the scope of the present disclosure. Moreover, the present disclosure contemplates that many users can use one Computer 1902, or that one user can use multiple computers 1902.

In typical implementations, processing of the previously described methodology is implemented on a small-scale, clustered computing platform. Smaller overall data sets can reduce processing needs to, for example, a high-end desktop- or laptop-type computer with enough available time allowed for processing (for example, less than 30 minutes).

Described implementations of the subject matter can include one or more features, alone or in combination.

For example, in a first implementation, a computer-implemented method, comprising: receiving seismic survey data; indexing the received seismic survey data into index sets and partitioning each index set into data blocks; for each particular data block of a particular index set: slicing the particular data block into frequency slices; for each particular frequency slice of the particular data block, processing the particular frequency slice to remove random and erratic noise by: forming a Hankel matrix from the particular frequency slice; determining an optimal rank for the Hankel matrix; determining a clean signal and erratic noise from the ranked Hankel matrix; and returning the clean signal and erratic noise for the particular frequency slice; and assembling a clean signal data set from the index sets.

The foregoing and other described implementations can each optionally include one or more of the following features:

A first feature, combinable with any of the following features, further comprising: detecting extreme values in the indexed seismic survey data; removing the extreme values from the indexed seismic survey data to generate filtered seismic survey data; and estimating ambient noise spectra in the filtered seismic survey data.

A second feature, combinable with any of the previous or following features, further comprising performing a Fourier transform on the data block to transform the data block into a frequency domain.

A third feature, combinable with any of the previous or following features, wherein the determination of the optimal rank for the Hankel matrix is based on either a rank-revealing decomposition or a low-rank approximation.

A fourth feature, combinable with any of the previous or following features, wherein the rank-revealing decomposition is one of a QR decomposition, a Lanczos bidiagonalization, or a partial singular value decomposition (SVD).

A fifth feature, combinable with any of the previous or following features, wherein determining the clean signal and the erratic noise from the ranked Hankel matrix further comprises obtaining a vector from the ranked Hankel matrix, wherein the clean signal and the erratic noise are separate components of the obtained vector.

A sixth feature, combinable with any of the previous or following features, further comprising performing an inverse Fourier transform on the returned clean signal and erratic noise for the particular frequency slice.

In a second implementation, a non-transitory, computer-readable medium storing one or more instructions executable by a computer system to perform operations comprising: receiving seismic survey data; indexing the received seismic survey data into index sets and partitioning each index set into data blocks; for each particular data block of a particular index set: slicing the particular data block into frequency slices; for each particular frequency slice of the particular data block, processing the particular frequency slice to remove random and erratic noise by: forming a Hankel matrix from the particular frequency slice; determining an optimal rank for the Hankel matrix; determining a clean signal and erratic noise from the ranked Hankel matrix; and returning the clean signal and erratic noise for the particular frequency slice; and assembling a clean signal data set from the index sets.

The foregoing and other described implementations can each optionally include one or more of the following features:

A first feature, combinable with any of the following features, further comprising: detecting extreme values in the indexed seismic survey data; removing the extreme values from the indexed seismic survey data to generate filtered seismic survey data; and estimating ambient noise spectra in the filtered seismic survey data.

A second feature, combinable with any of the previous or following features, further comprising performing a Fourier transform the data block to transform the data block into a frequency domain.

A third feature, combinable with any of the previous or following features, wherein the determination of the optimal rank for the Hankel matrix is based on either a rank-revealing decomposition or a low-rank approximation.

A fourth feature, combinable with any of the previous or following features, wherein the rank-revealing decomposition is one of a QR decomposition, a Lanczos bidiagonalization, or a partial singular value decomposition (SVD).

A fifth feature, combinable with any of the previous or following features, wherein determining the clean signal and the erratic noise from the ranked Hankel matrix further comprises obtaining a vector from the ranked Hankel matrix, wherein the clean signal and the erratic noise are separate components of the obtained vector.

A sixth feature, combinable with any of the previous or following features, further comprising performing an inverse Fourier transform on the returned clean signal and erratic noise for the particular frequency slice.

In a third implementation, a computer-implemented system, comprising: a computer memory; and a hardware processor interoperably coupled with the computer memory and configured to perform operations comprising: receiving seismic survey data; indexing the received seismic survey data into index sets and partitioning each index set into data blocks; for each particular data block of a particular index set: slicing the particular data block into frequency slices; for each particular frequency slice of the particular data block, processing the particular frequency slice to remove random and erratic noise by: forming a Hankel matrix from the particular frequency slice; determining an optimal rank for the Hankel matrix; determining a clean signal and erratic noise from the ranked Hankel matrix; and returning the clean signal and erratic noise for the particular frequency slice; and assembling a clean signal data set from the index sets.

The foregoing and other described implementations can each optionally include one or more of the following features:

A first feature, combinable with any of the following features, further comprising: detecting extreme values in the indexed seismic survey data; removing the extreme values from the indexed seismic survey data to generate filtered seismic survey data; and estimating ambient noise spectra in the filtered seismic survey data.

A second feature, combinable with any of the previous or following features, further comprising performing a Fourier transform the data block to transform the data block into a frequency domain.

A third feature, combinable with any of the previous or following features, wherein the determination of the optimal rank for the Hankel matrix is based on either a rank-revealing decomposition or a low-rank approximation.

A fourth feature, combinable with any of the previous or following features, wherein the rank-revealing decomposition is one of a QR decomposition, a Lanczos bidiagonalization, or a partial singular value decomposition (SVD).

A fifth feature, combinable with any of the previous or following features, wherein determining the clean signal and the erratic noise from the ranked Hankel matrix further comprises obtaining a vector from the ranked Hankel matrix, wherein the clean signal and the erratic noise are separate components of the obtained vector.

A sixth feature, combinable with any of the previous or following features, further comprising performing an inverse Fourier transform on the returned clean signal and erratic noise for the particular frequency slice.

In some implementations, the described methodology can be configured to send messages, instructions, or other communications to a computer-implemented controller, database, or other computer-implemented system to dynamically initiate control of, control, or cause another computer-implemented system to perform a computer-implemented or other function/operation. For example, operations based on data, operations, outputs, or interaction with a GUI can be transmitted to cause operations associated with a computer, database, network, or other computer-based system to perform storage efficiency, data retrieval, or other operations consistent with this disclosure. In another example, interacting with any illustrated GUI can automatically result in one or more instructions transmitted from the GUI to trigger requests for data, storage of data, analysis of data, or other operations consistent with this disclosure.

In some instances, transmitted instructions can result in control, operation, modification, enhancement, or other operations with respect to a tangible, real-world piece of computing or other equipment. For example, the described GUIs can send a request to slow or speed up a computer database magnetic/optical disk drive, shut down/activate a computing system, cause a network interface device to disable, throttle, or increase data bandwidth allowed across a network connection, or sound an audible/visual alarm (such as, a mechanical alarm/light emitting device) as a notification of a result, behavior, determination, or analysis with respect to a computing system(s) associated with the described methodology or interacting with the computing system(s) associated with the described methodology.

In some implementation, the output of the described methodology can be used to dynamically influence, direct, control, influence, or manage tangible, real-world equipment related to hydrocarbon production, analysis, and recovery or for other purposes consistent with this disclosure. For example, real-time data received from an ongoing drilling operation can be incorporated into an analysis performed using the described methodology. Improved quality of produced 2D/3D seismic/structural images, including the real-time data, can be used for various purposes. For example, depending on a generated result(s) of the described methodology, a wellbore trajectory can be modified, a drill speed can be increased or reduced, a drill can be stopped, an alarm can be activated/deactivated (such as, visual, auditory, or voice alarms), refinery or pumping operations can be affected (for example, stopped, restarted, accelerated, or reduced). Other examples can include alerting geo-steering and directional drilling staff when underground obstacles have been detected (such as, with a visual, auditory, or voice alarm). In some implementations, the described methodology can be integrated as part of a dynamic computer-implemented control system to control, influence, or use with any hydrocarbon-related or other tangible, real-world equipment consistent with this disclosure.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special purpose logic circuitry, for example, a central processing unit (CPU), a field programmable gate array (FPGA), or an application-specific integrated circuit (ASIC). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    improving denoising performance including using an automated process for denoising large-scale data sets, the automated process being adaptable to local signal and noise characteristics of a local region, the automated process comprising:
        receiving, by an automated denoising system, seismic survey data;
        indexing, by the automated denoising system, the received seismic survey data into index sets and partitioning each index set into data blocks;
        estimating, by the automated denoising system, ambient noise spectra of the seismic survey data;
        tuning algorithm parameters and model assumptions of the automated denoising system based on the local signal and noise characteristics and the estimated ambient noise spectra;
        determining a normal range of values for the local region;
        for each particular data block of a particular index set:
            slicing the particular data block into frequency slices; and
            for each particular frequency slice of the particular data block and using the tuned algorithm parameters and model assumptions, processing the particular frequency slice to remove random and erratic noise by:
                forming a Hankel matrix from the particular frequency slice;
                determining an optimal rank for the Hankel matrix;
                determining a clean signal and erratic noise from the ranked Hankel matrix; and
                returning the clean signal and erratic noise for the particular frequency slice;
        assembling, by the automated denoising system, a clean signal data set from the index sets; and
        providing, by the automated denoising system, the clean signal data set for drilling input.

2. The computer-implemented method of claim 1, further comprising:
    detecting, using the normal range of values for the local region, extreme values in the indexed seismic survey data;
    removing the extreme values from the indexed seismic survey data to generate filtered seismic survey data; and
    estimating the ambient noise spectra in the filtered seismic survey data.

3. The computer-implemented method of claim 2, further comprising performing a Fourier transform on the data block to transform the data block into a frequency domain.

4. The computer-implemented method of claim 1, wherein the determination of the optimal rank for the Hankel matrix is based on either a rank-revealing decomposition or a low-rank approximation.

5. The computer-implemented method of claim 4, wherein the rank-revealing decomposition is one of a QR decomposition, a Lanczos bidiagonalization, or a partial singular value decomposition (SVD).

6. The computer-implemented method of claim 1, wherein determining the clean signal and the erratic noise from the ranked Hankel matrix further comprises obtaining a vector from the ranked Hankel matrix, wherein the clean signal and the erratic noise are separate components of the obtained vector.

7. The computer-implemented method of claim 1, further comprising performing an inverse Fourier transform on the returned clean signal and erratic noise for the particular frequency slice.

8. A non-transitory, computer-readable medium storing one or more instructions executable by a computer system to perform operations comprising:

improving denoising performance including using an automated process for denoising large-scale data sets, the automated process being adaptable to local signal and noise characteristics of a local region, the automated process comprising:
  receiving, by an automated denoising system, seismic survey data;
  estimating, by the automated denoising system, ambient noise spectra of the seismic survey data;
  indexing, by the automated denoising system, the received seismic survey data into index sets and partitioning each index set into data blocks;
  tuning algorithm parameters and model assumptions of the automated denoising system based on the local signal and noise characteristics and the estimated ambient noise spectra;
  determining a normal range of values for the local region;
  for each particular data block of a particular index set:
    slicing the particular data block into frequency slices; and
    for each particular frequency slice of the particular data block and using the tuned algorithm parameters and model assumptions, processing the particular frequency slice to remove random and erratic noise by:
      forming a Hankel matrix from the particular frequency slice;
      determining an optimal rank for the Hankel matrix;
      determining a clean signal and erratic noise from the ranked Hankel matrix; and
      returning the clean signal and erratic noise for the particular frequency slice;
  assembling, by the automated denoising system, a clean signal data set from the index sets; and
  providing, by the automated denoising system, the clean signal data set for drilling input.

9. The non-transitory, computer-readable medium of claim 8, further comprising:
  detecting, using the normal range of values for the local region, extreme values in the indexed seismic survey data;
  removing the extreme values from the indexed seismic survey data to generate filtered seismic survey data; and
  estimating the ambient noise spectra in the filtered seismic survey data.

10. The non-transitory, computer-readable medium of claim 9, further comprising performing a Fourier transform on the data block to transform the data block into a frequency domain.

11. The non-transitory, computer-readable medium of claim 8, wherein the determination of the optimal rank for the Hankel matrix is based on either a rank-revealing decomposition or a low-rank approximation.

12. The non-transitory, computer-readable medium of claim 11, wherein the rank-revealing decomposition is one of a QR decomposition, a Lanczos bidiagonalization, or a partial singular value decomposition (SVD).

13. The non-transitory, computer-readable medium of claim 8, wherein determining the clean signal and the erratic noise from the ranked Hankel matrix further comprises obtaining a vector from the ranked Hankel matrix, wherein the clean signal and the erratic noise are separate components of the obtained vector.

14. The non-transitory, computer-readable medium of claim 8, further comprising performing an inverse Fourier transform on the returned clean signal and erratic noise for the particular frequency slice.

15. A computer-implemented system, comprising:
  a computer memory; and
  a hardware processor interoperably coupled with the computer memory and configured to perform operations comprising:
    improving denoising performance including using an automated process for denoising large-scale data sets, the automated process being adaptable to local signal and noise characteristics of a local region, the automated process comprising:
      receiving, by an automated denoising system, seismic survey data;
      estimating, by the automated denoising system, ambient noise spectra of the seismic survey data;
      indexing, by the automated denoising system, the received seismic survey data into index sets and partitioning each index set into data blocks;
      tuning algorithm parameters and model assumptions of the automated denoising system based on the local signal and noise characteristics and the estimated ambient noise spectra;
      determining a normal range of values for the local region;
      for each particular data block of a particular index set:
        slicing the particular data block into frequency slices; and
        for each particular frequency slice of the particular data block and using the tuned algorithm parameters and model assumptions, processing the particular frequency slice to remove random and erratic noise by:
          forming a Hankel matrix from the particular frequency slice;
          determining an optimal rank for the Hankel matrix;
          determining a clean signal and erratic noise from the ranked Hankel matrix; and
          returning the clean signal and erratic noise for the particular frequency slice;
      assembling, by the automated denoising system, a clean signal data set from the index sets; and
      providing, by the automated denoising system, the clean signal data set for drilling input.

16. The computer-implemented system of claim 15, further comprising:
  detecting, using the normal range of values for the local region, extreme values in the indexed seismic survey data;
  removing the extreme values from the indexed seismic survey data to generate filtered seismic survey data; and
  estimating the ambient noise spectra in the filtered seismic survey data.

17. The computer-implemented system of claim 16, further comprising performing a Fourier transform on the data block to transform the data block into a frequency domain.

18. The computer-implemented system of claim 15, wherein the determination of the optimal rank for the Hankel matrix is based on either a rank-revealing decomposition or a low-rank approximation, and the rank-revealing decomposition is one of a QR decomposition, a Lanczos bidiagonalization, or a partial singular value decomposition (SVD).

19. The computer-implemented system of claim 15, wherein determining the clean signal and the erratic noise from the ranked Hankel matrix further comprises obtaining a vector from the ranked Hankel matrix, wherein the clean signal and the erratic noise are separate components of the obtained vector.

20. The computer-implemented system of claim 15, further comprising performing an inverse Fourier transform on the returned clean signal and erratic noise for the particular frequency slice.

\* \* \* \* \*